United States Patent
Shivamoggi et al.

(10) Patent No.: US 12,413,606 B2
(45) Date of Patent: Sep. 9, 2025

(54) TECHNIQUES FOR DETECTING CYBERATTACKS ON AN AUTHENTICATION SYSTEM

(71) Applicant: Rapid7, Inc., Boston, MA (US)

(72) Inventors: Vasudha Shivamoggi, Arlington, MA (US); Roy Hodgman, Cambridge, MA (US); Katherine Wilbur, Brookline, MA (US)

(73) Assignee: Rapid7, Inc., Boston, MA (US)

( * ) Notice: Subject to any disclaimer, the term of this patent is extended or adjusted under 35 U.S.C. 154(b) by 228 days.

(21) Appl. No.: 18/478,302

(22) Filed: Sep. 29, 2023

(65) Prior Publication Data

US 2025/0112938 A1    Apr. 3, 2025

(51) Int. Cl.
*H04L 9/40*    (2022.01)

(52) U.S. Cl.
CPC .......... *H04L 63/1416* (2013.01); *H04L 63/08* (2013.01)

(58) Field of Classification Search
CPC ........................... H04L 63/1416; H04L 63/08
USPC ............................................................ 726/7
See application file for complete search history.

(56) References Cited

U.S. PATENT DOCUMENTS

| | | | | |
|---|---|---|---|---|
| 8,225,281 | B1* | 7/2012 | Hardinger | G06F 8/70 717/174 |
| 9,183,384 | B1* | 11/2015 | Bruhmuller | G06F 21/552 |
| 10,701,094 | B2* | 6/2020 | Kirti | H04L 63/1425 |
| 11,436,307 | B2* | 9/2022 | Pham | G06F 21/316 |
| 11,637,844 | B2* | 4/2023 | Shenoy | H04W 12/67 726/23 |
| 2016/0078203 | A1* | 3/2016 | Moloian | H04L 63/102 726/17 |
| 2016/0127380 | A1* | 5/2016 | Steele | H04L 63/14 726/7 |
| 2018/0375886 | A1* | 12/2018 | Kirti | H04L 67/10 |
| 2019/0068627 | A1* | 2/2019 | Thampy | H04L 63/1425 |
| 2021/0073819 | A1* | 3/2021 | Hernandez | G06Q 20/4016 |
| 2022/0027820 | A1* | 1/2022 | Chalam | G06Q 10/02 |
| 2022/0385656 | A1* | 12/2022 | Gujarathi | H04L 63/0876 |
| 2024/0064135 | A1* | 2/2024 | Sherlock | H04L 63/08 |

OTHER PUBLICATIONS

[No Author Listed], Steal or Forge Kerberos Tickets: Kerberoasting. Mitre ATT&CK. Feb. 11, 2020, Last modified Mar. 30, 2023. 3 pages. https://attack.mitre.org/techniques/T1558/003/ (Last accessed Sep. 28, 2023).

(Continued)

*Primary Examiner* — Dant B Shaifer Harriman
(74) *Attorney, Agent, or Firm* — Wolf, Greenfield & Sacks, P.C.

(57) ABSTRACT

Some embodiments provide techniques for detecting cyberattacks against a software service authentication system that authorizes access to software services. The techniques access a user activity profile specifying values of parameters indicating the user's pattern of requesting access to unique software service(s). The techniques monitor the activity of the user over a time period to obtain software request data indicating request(s) by the user to access software services in the time period. The techniques determine, using the software service request data and the user activity profile, whether computing activity of the user during the time period is anomalous.

19 Claims, 12 Drawing Sheets

(56) References Cited

OTHER PUBLICATIONS

Berlin, Defending Against Active Directory Kerberos Attacks. Blumira. Feb. 15, 2021. 7 pages. https://www.blumira.com/active-directory-kerberos-attacks/ (Last accessed Sep. 28, 2023).

Medin, Detecting Kerberoasting. Red Siege Information Security. Oct. 21, 2020. 9 pages. https://redsiege.com/tools-techniques/2020/10/detecting-kerberoasting/ (Last accessed Sep. 28, 2023).

\* cited by examiner

TECHNIQUES FOR DETECTING CYBERATTACKS ON AN AUTHENTICATION SYSTEM

BACKGROUND

A software service may comprise one or more software applications executed by a computer system (e.g., one or more servers). A user device may access a software service through the computer system. For example, the user device may transmit requests to the computer system to use the software service. A user device may access the software service via a communication network (e.g., the Internet, an intranet). For example, a user device may access a software service through an Internet browser application.

Various authentication protocols are used in computing environments to control users' access to software services. An authentication protocol may be used to verify the identity of a user and authorize the user to access a software service only when the user's identity is verified. Different authentication protocols use different mechanisms to control access to software services. A given authentication protocol may have vulnerabilities that can be taken advantage of by an adversary (e.g., a hacker) to gain unauthorized access to software services in a computing environment.

SUMMARY

Some embodiments provide techniques for detecting cyberattacks against a software service authentication system that authorizes access to software services. The techniques access a user activity profile specifying values of parameters indicating the user's pattern of requesting access to unique software service(s). The techniques monitor the activity of the user over a time period to obtain software request data indicating request(s) by the user to access software services in the time period. The techniques determine, using the software service request data and the user activity profile, whether computing activity of the user during the time period is anomalous.

Some embodiments provide a method for detecting attacks against a software service authentication system configured to authorize access to software services, the method comprising using at least one processor to perform: accessing a first user activity profile specifying values of parameters indicating a first user's pattern of requesting access to one or more unique software services through the software service authentication system; monitoring computing activity of the first user during a first time period to obtain software service request data indicating one or more requests by the first user during the first time period to access one or more software services through the software service authentication system; and determining, using the software service request data and the first user activity profile, whether the computing activity of the first user during the first time period is anomalous, the determining comprising: determining, using the values of the parameters specified by the first user activity profile, whether the one or more requests by the first user during the first time period match the first user's pattern of requesting access to one or more unique software services through the software service authentication system; and determining that the computing activity of the first user during the first time period is anomalous when it is determined that the one or more requests by the first user during the first time period do not match the first user's pattern of requesting access to one or more unique software services through the software service authentication system.

Some embodiments provide a system for detecting cyberattacks against a software service authentication system configured to authorize access to software services. The system comprises: at least one processor; and at least one non-transitory computer-readable storage medium storing instructions that, when executed by the at least one processor. The instructions, when executed by the at least one processor, cause the at least one processor to: access a first user activity profile specifying values of parameters indicating a first user's pattern of requesting access to one or more unique software services through the software service authentication system; monitor computing activity of the first user during a first time period to obtain software service request data indicating one or more requests by the first user during the first time period to access one or more software services through the software service authentication system; and determine, using the software service request data and the first user activity profile, whether the computing activity of the first user during the first time period is anomalous, the determining comprising: determining, using the values of the parameters specified by the first user activity profile, whether the one or more requests by the first user during the first time period match the first user's pattern of requesting access to one or more unique software services through the software service authentication system; and determining that the computing activity of the first user during the first time period is anomalous when it is determined that the one or more requests by the first user during the first time period do not match the first user's pattern of requesting access to one or more unique software services through the software service authentication system.

Some embodiments provide a non-transitory computer-readable storage medium storing instructions that, when executed by at least one processor, cause the at least one processor to perform a method for detecting attacks against a software service authentication system configured to authorize access to software services. The method comprises: accessing a first user activity profile specifying values of parameters indicating a first user's pattern of requesting access to one or more unique software services through the software service authentication system; monitoring computing activity of the first user during a first time period to obtain software service request data indicating one or more requests by the first user during the first time period to access one or more software services through the software service authentication system; and determining, using the software service request data and the first user activity profile, whether the computing activity of the first user during the first time period is anomalous, the determining comprising: determining, using the values of the parameters specified by the first user activity profile, whether the one or more requests by the first user during the first time period match the first user's pattern of requesting access to one or more unique software services through the software service authentication system; and determining that the computing activity of the first user during the first time period is anomalous when it is determined that the one or more requests by the first user during the first time period do not match the first user's pattern of requesting access to one or more unique software services through the software service authentication system.

The foregoing summary is non-limiting.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
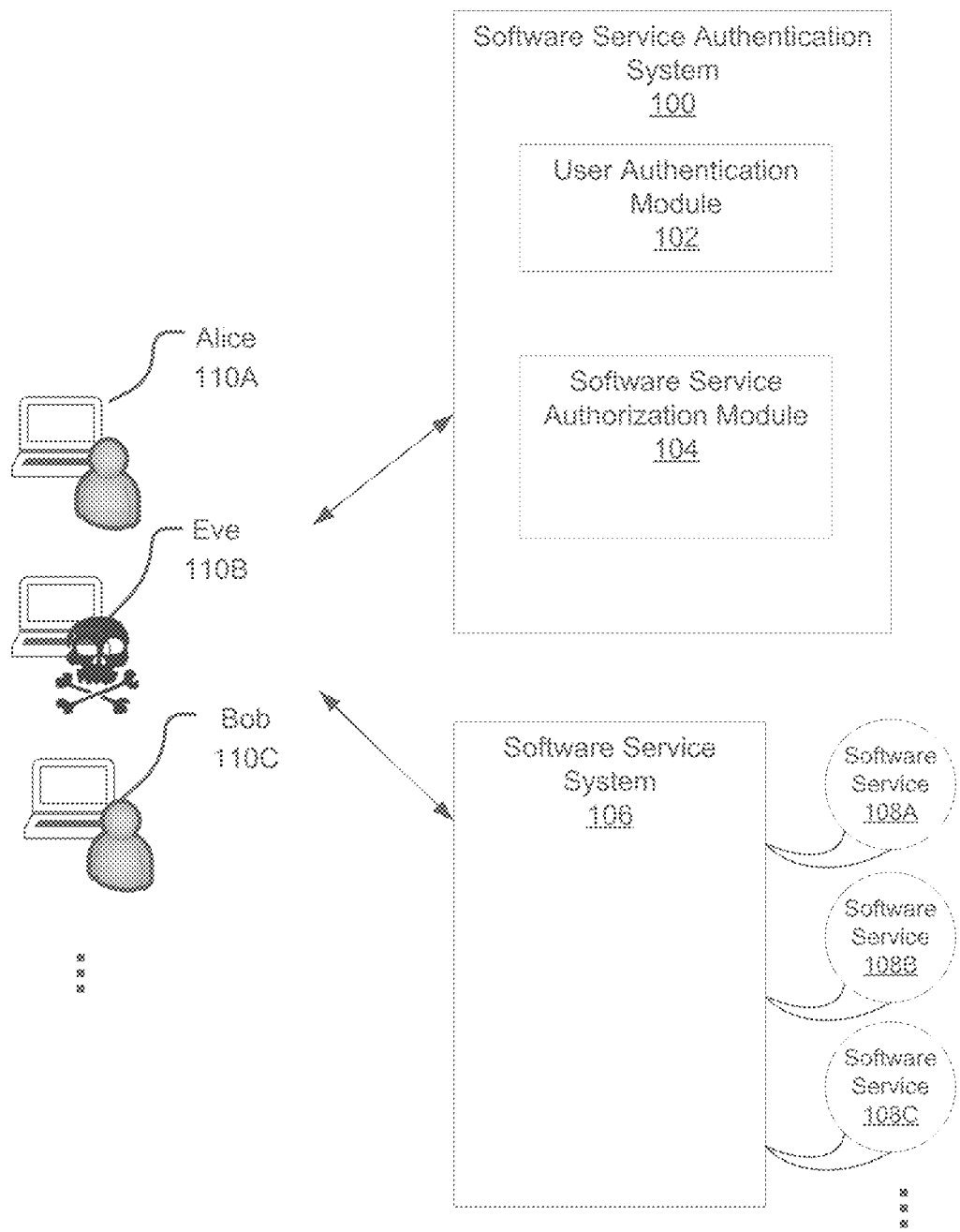
FIG. 1A shows an illustrative computing environment in which a software service authentication system may operate.

The inventors have developed techniques for detecting cyberattacks on a software service authentication system that controls users' access to one or more software services. The software service authentication system may control users' access to the software service(s) using an authentication protocol. For example, in some embodiments, the software service authentication system may use the Kerberos authentication protocol to control users' access software service(s), and the techniques described herein may be used to detect and prevent a type of cyberattack referred to as "Kerberoasting," which takes advantage of certain vulnerabilities in the Kerberos authentication protocol.

Conventional techniques of detecting attacks in computing environments in which an authentication protocol is used to control access to software services involve identifying an abnormally high number of requests by a user to access software services. For example, conventional techniques may detect an attack when a user submits more than a threshold number of requests to access software services in a time period. However, conventional techniques are inadequate because attackers have developed techniques for performing attacks using a low number of requests.

As an illustrative example, in computing environments in which the Kerberos authentication protocol is used, users request access to software services by requesting software service tickets. An adversary may attack the system by requesting a low number (e.g., 1, 2, or 3) of software service ticket(s) and extracting password(s) associated with software service accounts from the software service ticket(s) (e.g., using brute force techniques to decrypt the software ticket(s) encrypted using the password(s)). Conventional techniques would fail to detect such an attack in an environment that uses the Kerberos authentication protocol because they would fail to detect the low number of request (s) for software service ticket(s) as an attack.

One solution to addressing the above-described problem in conventional techniques of detecting attacks would be to lower the threshold number of requests used to detect an attack. However, this results in a large number of false positives (allegedly detecting an attack, when no attack is taking place). Accordingly, the inventors have recognized a need for an improved attack detection technique that can distinguish attacks that use a lower number of requests to access software services from benign user activity.

Accordingly, the inventors have developed improved techniques for detecting cyberattacks in computing environments in which an authentication protocol is used to control access to software services. According to some embodiments, a cyberattack detection system may use the software service request history of each user to identify the user's pattern of requesting access to unique software services and quantify the user's pattern in a user activity profile. The system uses the user activity profiles associated with different users to customize attack detection for each user based on the user's pattern of accessing unique software services. The system collects information about users' computing activity during a time period and determines whether any of the users are behaving anomalously during the time period. The system may determine whether a given user behaved anomalously during the time period by determining whether requests to access software services in the time period match a pattern of activity indicated by the user's user activity profile.

In contrast to conventional techniques, embodiments described herein are capable of detecting attacks that involve a low number of requests to access software service requests. Attack detection is performed by determining whether a user's activity matches the user's previous pattern of accessing unique software services. Thus, even if an attacker issues a low number of requests to access software services, an attack may be detected by detecting that the requests do not match the user's pattern of previous activity (e.g., as indicated by a pattern of the user's activity profile). This improves the robustness of attack detection and thus provides improved security in a computing environment. For example, some embodiments may be used to detect attacks in a computing environment in which a software service authentication system uses the Kerberos protocol to authorize access to software services. An attack may be detected by determining whether a user's request(s) for software service ticket(s) match a pattern of requesting software service tickets indicated by a user activity profile. If the user's request(s) for software service ticket(s) do not match the pattern indicated by the user activity profile, the user's activity may be identified as anomalous. The user may be further investigated to determine if the user was compromised by an adversary carrying out an attack (e.g., to extract the software service ticket(s) and use the software service ticket(s) to obtain password(s) associated with software service(s)).

Some embodiments provide a system for detecting cyber-attacks (e.g., Kerberoasting attacks) against a software service authentication system configured to authorize access to software services. The software service authentication system may be configured to authorize access to software services using an authentication protocol (e.g., Kerberos authentication). The system may be configured to: (1) access a first user activity profile specifying values of parameters indicating a first user's pattern of requesting access to one or more unique software services through the software service authentication system; (2) monitor computing activity of the first user during a first time period to obtain software service request data indicating one or more requests by the first user during the first time period to access one or more software services through the software service authentication system; and (3) determine, using the software service request data and the first user activity profile, whether the computing activity of the first user during the first time period is anomalous. The system may be configured to determine whether the computing activity of the first user during the first time period is anomalous by: (1) determining, using the values of the parameters specified by the first user activity profile, whether the one or more requests by the first user during the first time period match the first user's pattern of requesting access to one or more unique software services through the software service authentication system; and (2) determining that the computing activity of the first user during the first time period is anomalous when it is determined that the one or more requests by the first user during the first time period do not match the first user's pattern of requesting access to one or more unique software services through the software service authentication system.

In some embodiments, the values of parameters indicating the first user's pattern of requesting access to one or more unique software services indicate a threshold number of unique software service requests. In some embodiments, determining, using the values of the parameters specified by the first user activity profile, whether the one or more requests by the first user during the first time period match the first user's pattern of requesting access to one or more unique software services through the software service authentication system comprises: (1) determining a number of unique software service requests of the one or more requests by the first user during the first time period; and (2) determining whether the number of unique software service requests exceeds the threshold number of unique software service requests indicated by the first user activity profile.

In some embodiments, the first user is authorized to request access to software services after authentication of the user by the software service authentication system. The values of the parameters indicating the first user's pattern of requesting access to one or more unique software services may indicate a threshold ratio of authentications to unique software service requests. In some embodiments, determining, using the values of the parameters specified by the first user activity profile, whether the one or more requests by the first user during the first time period match the first user's pattern of requesting access to one or more unique software services through the software service authentication system comprises: (1) determining a number of unique software service requests after a first authentication of the first user in the first time period; (2) determining an inverse of the number of unique software service requests after the first authentication of the first user in the first time period; and (3) determining whether the inverse of the number of unique software service requests is less than the threshold ratio of authentications to unique software service requests. In some embodiments, the system may be configured to determine the threshold ratio of authentications to unique software servicer requests by: (1) determining, for each of a plurality of authentications of the user in a time period preceding the first time period, an inverse of a number of unique software service requests after the authentication to obtain a plurality of ratios of authentications to unique software service requests; and (2) determining the threshold ratio of authentications to unique software service requests using the plurality of ratios of authentications to unique software service requests.

In some embodiments, accessing the first user activity profile comprises: (1) accessing user software service request data indicating requests by the first user to access software services during a time period preceding the first time period; and (2) generating the first user activity profile using the user service request data at least in part by determining the values of the parameters. In some embodiments, the software service request data comprises: an indication of a plurality of authentications of the first user in the time period preceding the first time period, the plurality of authentications associated with respective ones of a plurality of sessions; and an indication of software service requests in the plurality of sessions. In some embodiments, the time period preceding the first time period ends at least a threshold amount of time (e.g., 12 hours) prior to a start of the first time period. In some embodiments, the values of the parameters indicating the first user's pattern of requesting access to one or more unique software services through the software service authentication system indicate one or more software services that the first user previously requested to access in a time period preceding the first time period. In some embodiments, determining, using the values of the parameters specified by the first user activity profile, whether the one or more requests by the first user during the first time period match the first user's pattern of requesting access to one or more unique software services through the software service authentication system comprises: (1) determining a number of new unique software services to which the first user requests access during the first time period that are not included in the one or more unique software services that the first user previously requested to access in the time period preceding the first time period; and (2) determining whether the number of new unique software services is greater than or equal to a threshold number of new software services.

In some embodiments, the system may be configured to transmit, to at least one device, an indication of a detected attack by the first user when it is determined that the computing activity of the first user during the first time period is anomalous. In some embodiments, the system may be configured to prevent the first user from being authorized to access one or more software services through the software service authentication system when it is determined that the computing activity of the first user during the first time period is anomalous.

In some embodiments, monitoring computing activity of the first user during the first time period to obtain the software service request data indicating the one or more requests by the first user during the first time period to access the one or more software services through the software service authentication system comprises: storing an indication of one or more requests for one or more software service tickets to access the one or more software services.

In some embodiments, the system may be configured to: (1) monitor computing activity of the first user during a second time period, preceding first time period, to obtain second software service request data indicating one or more requests by the first user during the second time period to access one or more software services through the software service authentication system; and (2) update the values of the parameters specified by the first user activity profile using the second software service request data prior to determining, using the software service request data and the first user activity profile, whether the computing activity of the first user during the first time period is anomalous.

Following below are more detailed descriptions of various concepts related to, and embodiments of, cyberattack detection systems and methods developed by the inventors. It should be appreciated that various aspects described herein may be implemented in any of numerous ways. Examples of specific implementations are provided herein for illustrative purposes only. In addition, the various aspects described in the embodiments below may be used alone or in any combination and are not limited to the combinations explicitly described herein.

FIG. 1A illustrates an example computing environment in which a software service authentication system 100 may operate. The software service system 100 in the example of FIG. 1A uses Kerberos authentication to authorize access to software services by users Alice 110A and Bob 110C. In the example environment of FIG. 1A, Alice 110A and Bob 110C may be legitimate users who have credentials to access software services 108A, 108B, 108C provided by the software service system 106. Eve 110B is an adversary without credentials to access any of the software services 108A, 108B, 108C.

The software service authentication system 100 includes a user authentication module 102 and a software service authorization module 104. The user authentication module 102 may be configured to authenticate users' credentials (e.g., usernames and passwords). The user authentication module 102 may be configured to allow authenticated users to request access to software services from the software service authorization module 104. The user authentication module 102 may also be referred to as an "authentication service (AS)".

The software service authorization module 104 may be configured to receive requests to access software services from users that were authenticated by the user authentication module 102. The software service authorization module 104 may be configured to grant users software service tickets that the users may use to access software services from the software service system 106. The software service authorization module 104 may also be referred to as a "ticket-granting service (TGS)".

The software service system 106 may be configured to execute the software services 108A, 108B, 108C. For example, the software service system 106 may comprise one or more application servers that host the software services 108A, 108B, 108C. The application server(s) may execute the software services 108A, 108B, 108C in response to requests from users. The software service system 106 may be configured to grant a user access to a particular software service when a user presents a valid software service ticket for the software service.

Figure 1B:
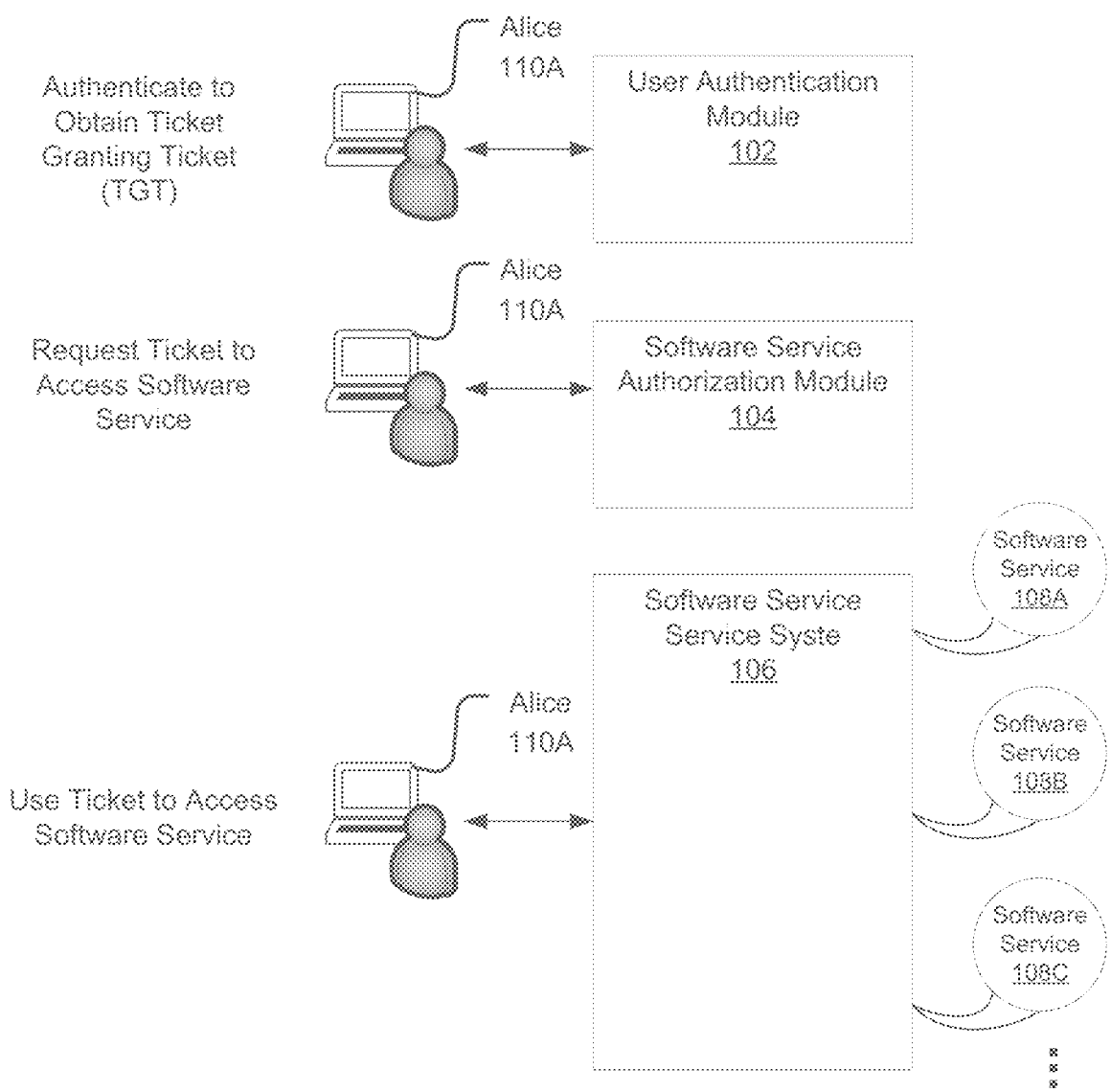
FIG. 1B illustrates authorization performed in the computing environment of FIG. 1A to grant a user access to one or more software services.

FIG. 1B illustrates authorization performed in the computing environment of FIG. 1A to grant Alice 110A access to one or more of the software services 108A, 108B, 108C. Alice 110A requests a ticket-granting ticket (TGT) from the user authentication module 102. Alice 110A may request the TGT by receiving user input indicating a username and password (e.g., through a graphical user interface (GUI)), and transforming the password into a symmetric key (e.g., by hashing). Alice 110A then encrypts a message using the symmetric key and transmits the encrypted message to the user authentication module 102. The user authentication module 102 authenticates Alice 110A by looking up the username in a datastore (e.g., a database of user credentials), and accessing a symmetric key associated with the username in the datastore. The user authentication module 102 attempts to decrypt the encrypted message received from Alice 110A using the accessed symmetric key. If the user authentication module 102 successfully decrypts the encrypted message, then the user authentication module 102 identifies Alice 110A as an authorized user. In this case, Alice 110A begins a session in which Alice 110A can request access to software services. The authentication module 102 transmits a TGT to Alice 110A along with a session key.

After receiving the TGT and the session key from the user authentication module 102, Alice 110A may request, from the software service authorization module 104, a software service ticket (also referred to as a "TGS ticket") to access one of the software services 108A, 108B, 108C. Alice 110A requests a software service ticket by transmitting, to the software service authorization module 104, the TGT and an identifier (e.g., a service principal name (SPN)) of the software service. Alice 110A may use the session key to encrypt a username and timestamp and send the encryption to the software service authorization module 104. The software service authorization module 104 validates the TGT. If the TGT is successfully validated, the software service authorization module 104 generates a software service ticket granting access to the requested software service. The software service authorization module 104 generates the software service ticket by encrypting information using a symmetric key associated with the software service. The symmetric key associated with the software service may be generated from a password (e.g., a plaintext password) of an account associated with the software service. For example, the symmetric key may be a hash of the password. The software service authorization module 104 transmits the generated software service ticket to Alice 110A. The account may be used to register the software service in the software service system 106. For example, the account may be used to register the software service in an active directory of the software service system 106.

Alice 110A uses the software service ticket obtained from the software service authorization module 104 to access the software service from the software service system 106. Alice 110A may access the software service by transmitting the software service ticket to the software service system 106. The software service system 106 verifies Alice's 110A identity using the software service ticket and then provides Alice 110A with access to the software service (e.g., by executing the software service and/or responding to requests to the software service received from Alice 110A).

Figure 1C:
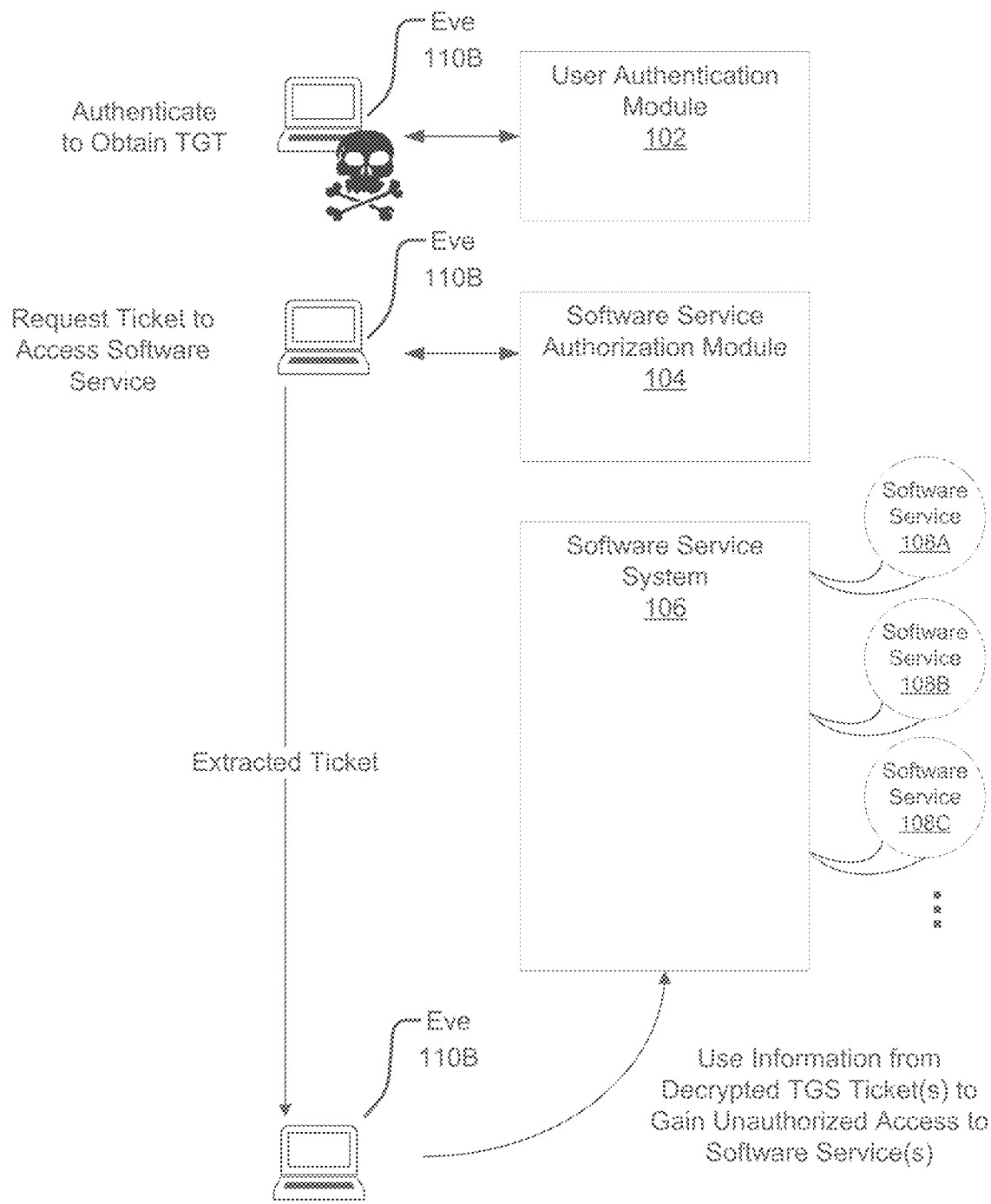
FIG. 1C illustrates an attack by an adversary in the computing environment of FIG. 1A to gain unauthorized access to a software service.

FIG. 1C illustrates an attack by Eve 110B to gain unauthorized access to one of the software services 108A, 108B, 108C. In this scenario. Eve 110B may have previously acquired Alices' 110A credentials (e.g., using malware, phishing emails, or by purchasing the credentials). Eve 110B may use the credentials to obtain a TGT from the user authentication module 102 and a software service ticket from the software service authorization module 104 as described herein with reference to FIG. 1B. Eve 110B may then extract the ticket (e.g., to another device), which is encrypted with a symmetric key associated with the software service. Eve 110B then attempts to crack the encryption to determine the password of an account associated with the software service (e.g., from which the key was generated). For example, Eve 110B may use a brute force attack to crack the encryption and determine the password. Eve 110B may then use the password to gain unauthorized access to the software service. For example, Eve 110B may use the password to gain unauthorized access to the software service's account (e.g., to modify a configuration of the software service or execute the software service).

Figure 2A:
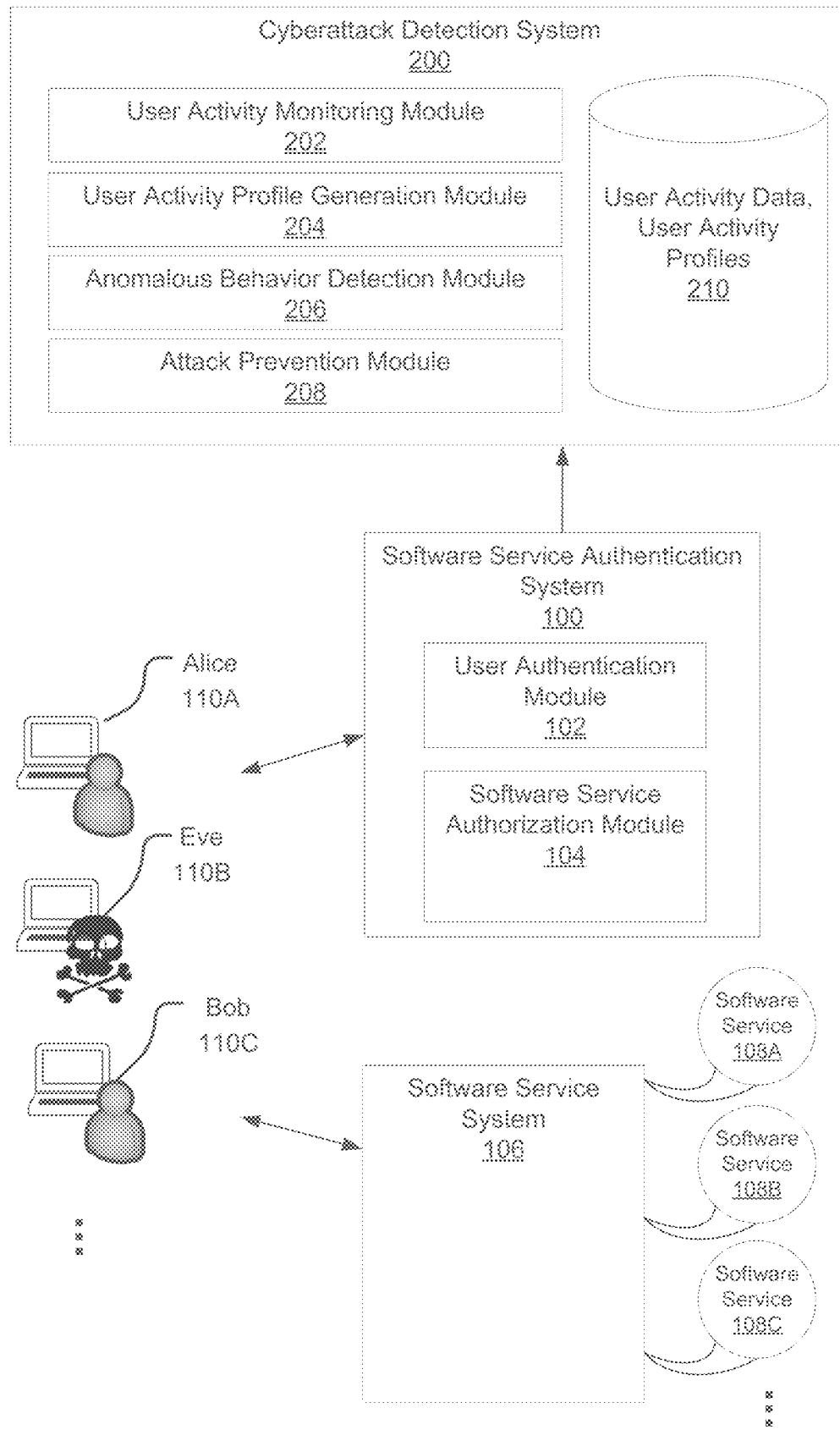
FIG. 2A shows a computer environment including a cyberattack detection system, according to some embodiments of the technology described herein.

FIG. 2A shows a computer environment in which some embodiments of the technology described herein may operate. The computer environment includes a cyberattack detection system 200 in addition to the software service authentication system 100 and the software service system 106 described herein with reference to FIGS. 1A-1C. The cyberattack detection system 200 may be configured to detect cyberattacks in the computing environment (e.g., attempts to extract software service tickets to determine passwords associated with software service accounts). In the example of FIG. 2A, Alice 110A, and Bob 110C may be legitimate users with credentials to access software services. Eve 110B may be an adversary that gains improper access using Alice's 110A or Bob's 110C credentials. The cyberattack detection system 200 may be configured to obtain data about the computing activity of Alice 110A and Bob 110C in the computing environment and use the data to determine if a user's activity is anomalous (e.g., because an adversary (e.g., Eve 110B) is using the user's credentials in a cyberattack). The cyberattack detection system 200 may be configured to perform attack prevention functions in response to the detection of an attack.

As shown in FIG. 2A, the cyberattack detection system 200 includes a user activity monitoring module 202, a user activity profile generation module 204, an anomalous behavior detection module 206, an attack prevention module 208, and a datastore 210. In some embodiments, the cyberattack detection system may comprise one or more computing devices (e.g., server(s)). The modules 202, 204, 206, 208 of the cyberattack detection system 200 may be implemented as sets of instructions that are executed by processor(s) of the computing device(s). In some embodiments, the datastore 210 may comprise memory of storage hardware that is part of the computing device(s) and/or separate from the computing device(s) (e.g., a distributed database).

In some embodiments, the user activity monitoring module 202 may be configured to monitor the computing activity of users. The user activity monitoring module 202 may be configured to monitor the computing activity of users by collecting data indicating requests by the users to access software services provided by the software service system 106. For each user, the user activity monitoring module 202 may track requests to access software services transmitted from the user to the software service authorization module 104. In some embodiments, the user activity monitoring module 202 may be configured to store a log for each user.

The log may store records of software service requests submitted by the user. For example, the log may include an entry corresponding to each software service request by the user. The entry may indicate, for each request, the time of the request (e.g., as a timestamp), an identifier of a requested software service, and/or other information about the request. In some embodiments, an entry may indicate attributes of the requested software service. Attributes may include an identifier (e.g., an SPN) of the software service, a type of encryption used to generate a key associated with the software service, and/or other attributes of the software service.

In some embodiments, the user activity monitoring module 202 may be configured to track requests to access a subset of software services provided by the software service system 106. In some embodiments, the user activity monitoring module 202 may be configured to track requests to access software services having associated keys generated using a particular type of encryption (e.g., because those software services are more vulnerable to attacks). For example, the user activity monitoring module 202 may track requests to access software services that have associated keys generated using RC4 encryption. As RC4 encryption is an 8-bit encryption, a key generated from an RC4 encryption may be easier to decrypt using brute force methods after extraction of the key by an adversary and, as a result, more vulnerable to attacks. Thus, the user activity monitoring module 202 may be configured to track requests to access software services with associated keys generated using RC4 encryption (e.g., without tracking requests to access other software services).

In some embodiments, the user activity monitoring module 202 may be configured to monitor the computing activity of users by collecting data indicating each authentication of the user. For each user, the user activity module 202 may track authentication for the user performed by the user authentication module 102. In some embodiments, the user activity monitoring module 202 may be configured to store a log for each user, where the log stores records of authentications of the user. For example, the log may include an entry corresponding to each authentication. The entry may indicate the time of the authentication (e.g., as a timestamp) and the result of the authentication (e.g., successful authentication or failed authentication).

Figure 4A:
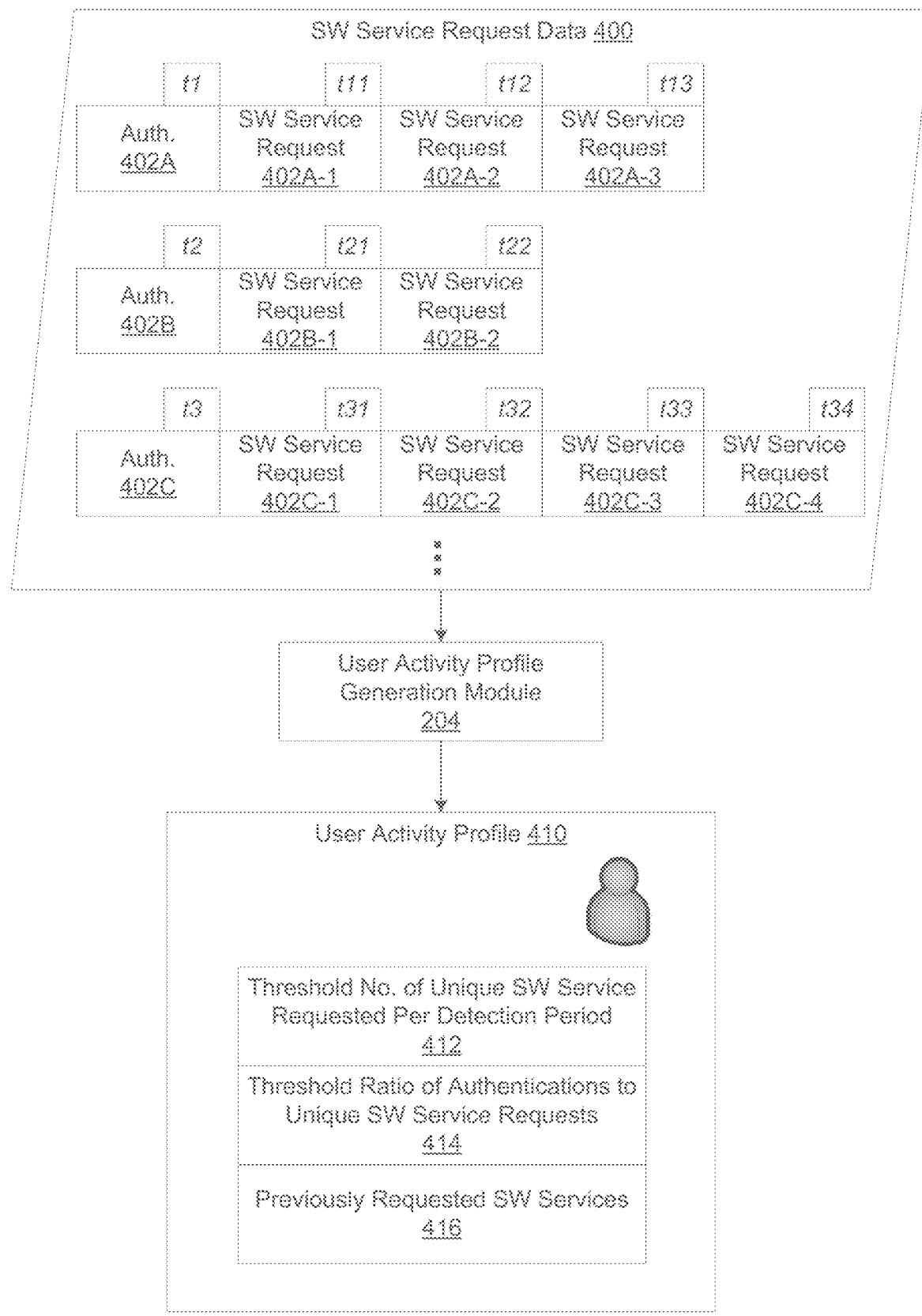
FIG. 4A illustrates software service request data that may be obtained by a cyberattack detection system and a user activity profile generated using the software service request data, according to some embodiments of the technology described herein.

Example data that may be collected about the computing activity of a given user by the user activity monitoring module 202 is described herein with reference to FIG. 4A.

In some embodiments, the user activity monitoring module 202 may be configured to collect data about the computing activity of users for the generation of user activity profiles (e.g., by the user activity profile generation module 204). The user activity monitoring module 202 may be configured to use user activity data collected during a time period for the generation and/or updating of user activity profiles. Such a time period may also be referred to herein as the "profiling period". The profiling period may be 1 day, 2 days, 3 days, 4 days, 5 days, 6 days, 7 days, 14 days, 21 days, 1 month, 2 months, or other suitable time period. For example, the user activity monitoring module 202 may generate a record storing 7 days of user activity for use in generating and/or updating user activity profiles. In some embodiments, the length of the profiling period may be configurable (e.g., by user input received through a graphical user interface (GUI) provided by the cyberattack detection system 200).

In some embodiments, the user activity monitoring module 202 may be configured to use data collected in a time period to perform attack detection (e.g., by comparing activity to patterns indicated by user activity profiles). The time period may also be referred to herein as the "detection period". The detection period may be 15 minutes, 30 minutes, 45 minutes 60 minutes, 90 minutes, 120 minutes, 180 minutes, or other suitable time period. For example, the user activity monitoring module 202 may use data collected in the last 60 minutes to perform detection. In some embodiments, the length of the detection period may be configurable (e.g., by user input received through a GUI provided by the cyberattack detection system 200).

In some embodiments, the profiling period may precede the detection period by at least a threshold amount of time. The threshold amount of time may be 3 hours, 6 hours, 12 hours, 24 hours, 36 hours, 48 hours, 72 hours, or other suitable amount of time. For example, the profiling period may precede the detection period by at least 12 hours. In some embodiments, the length of time between the profiling period and the detection period may be configurable (e.g., by user input received through a GUI provided by the cyberattack system 200).

In some embodiments, the user activity profile generation module 204 may be configured to generate user activity profiles using data collected by the user activity monitoring module 202. Each user activity profile may indicate a respective user's pattern of requesting access to one or more unique software services through the software service authentication system 100. In some embodiments, the user activity profile generation module 204 may be configured to store, in each user activity profile, values of various parameters indicative of a respective user's expected pattern of requesting access to software services. Example parameters that may be stored in a user activity profile include a threshold number of unique software services requested per detection period, a threshold authentication to unique software service request ratio, and/or an indication of software services previously accessed by the user. The user activity profile generation module 204 may be configured to determine values of the parameters using data collected by the user activity monitoring module 202.

In some embodiments, the user activity profile generation module 204 may be configured to update user activity profiles. In some embodiments, the user activity profile generation module 204 may be configured to update user activity profiles periodically. In some embodiments, the user activity profile generation module 204 may update user activity profiles every 1 day, 2 days, 3 days, 4 days, 5 days, 6 days, 7 days, 14 days, 21 days, 1 month, 2 months, or other suitable time period. For example, the user activity profile generation module 204 may update user activity profiles every 7 days. As another example, the user activity profile generation module 204 may update user activity profiles each time a process of cyberattack detection is performed. In some embodiments, the frequency of updating the user activity profiles may be a configurable value. For example, the frequency of updating the user activity profiles may be adjustable through a graphical user interface (GUI) provided to users of the cyberattack detection system 200. The user activity profile generation module 204 may be configured to update user activity profiles after a time period by updating values of parameters in the user activity profiles using data about the computing activity of users collected during a profiling period (e.g., that precedes a detection period). In this manner, the user activity profile generation module 204 may dynamically update user activity profiles to reflect changes in user activity over time.

In some embodiments, the user activity profile generation module 204 may be configured to determine parameter values in the user activity profiles as part of its detection process. For example, the user activity profile generation module 204 may compute parameter values for the user activity profiles using data collected in the most recent profiling period preceding a current detection period. Accordingly, the user activity profile generation module 204 may update user activity profiles such that they reflect the most recent patterns of user activity prior to using the user activity profiles for cyberattack detection.

In some embodiments, the anomalous behavior detection module 206 may be configured to use user activity profiles generated by the user activity profile generation module 204 to detect attacks. The anomalous behavior detection module 206 may be configured to determine, using a given user's user activity profile and software service request data, whether the user's computing activity in a time period (e.g., a detection period) is anomalous. The anomalous behavior detection module 206 may be configured to determine whether the user's computing activity is anomalous during a time period by: (1) determining, using parameter values specified by the user's activity profile, whether the user's computing activity matches a pattern of requesting access to one or more unique software services indicated by the user's activity profile; and (2) determining that the user's computing activity is anomalous during the time period when the user's computing activity does not match the pattern indicated by the user's activity profile.

In some embodiments, the anomalous behavior detection module 206 may be configured to determine whether a user's computing activity matches a pattern of requesting access to unique software service(s) using software service request data obtained during a time period (e.g., a detection period). In some embodiments, the anomalous behavior detection module 206 may be configured to determine the values of the parameter(s) using the software service request data and compare the values of the parameter(s) to the threshold values of the parameter(s) indicated in the user's activity profile. The anomalous behavior detection module 206 may be configured to determine whether the user's computing activity is anomalous based on the result of the comparison. As an illustrative example, the user's activity profile may indicate a threshold number of unique software service requests for the user in a detection period. The anomalous behavior detection module 206 may determine the number of unique software requests by the user in a detection period and compare the number of unique software requests to the threshold number of unique software requests indicated by the user's activity profile. As another example, the user's activity profile may indicate a threshold ratio of authentications to unique software service requests for the user. The anomalous behavior detection module 206 may determine an authentication to unique software service request ratio for the user during a detection period and compare the determined ratio to the threshold ratio indicated by the user's activity profile. As another example, the anomalous behavior detection module 206 may determine which unique software services the user requests access to in a detection period and compare the unique software services to a set of unique software services indicated by the user's activity profile.

In some embodiments, the anomalous behavior detection module 206 may be configured to determine whether a user's computing activity matches a pattern of requesting access to unique software service(s) using software service request data of the user by performing a multi-stage process.

In each stage, the anomalous behavior detection module 206 may be configured to use information from the user's activity profile to determine whether the user's activity meets a condition. When the user's activity meets the conditions of all the stages, the anomalous behavior detection module 206 may determine that the user's activity is anomalous and thus detect an attack. An example of such a technique is described herein with reference to FIG. 4B.

In some embodiments, the attack prevention module 208 may be configured to perform one or more functions to prevent an adversary from gaining unauthorized access to software services using stolen credentials. In some embodiments, the attack prevention module 208 may be configured to generate an alert specifying a user determined to be performing anomalous computing activity. For example, the attack prevention module 208 may generate an alert in a GUI indicating the user. The attack prevention module 208 may provide information about the user (e.g., software service request data, username, IP address, and/or other information about the user).

In some embodiments, the attack prevention module 208 may prevent the user from being authenticated, submitting software service requests, and/or accessing software service requests. For example, the attack prevention module 208 may cause the software service authentication system 100 to deny authentication of the user and/or to deny software service requests received from the user. As another example, the attack prevention module 208 may block the user from accessing one or more software services provided by the software service system 106. As another example, the attack prevention module 208 may request software service(s) that the user requested to access to change password(s) associated with the software service(s).

In some embodiments, the datastore 210 may comprise memory for storing user activity data (e.g., software service request data) obtained by the user activity monitoring module 202 and user activity profiles generated by the user activity profile generation module 204. In some embodiments, the datastore 210 may comprise one or more databases for storing the data. The datastore 210 may comprise storage hardware (e.g., one or more hard drives) for storing the data. In some embodiments, the datastore 210 may store configuration parameters for use in user activity profile generation and anomalous behavior detection. For example, the datastore 210 may store configuration parameters that can be adjusted by users (e.g., by providing input through a GUI)).

Figure 2B:
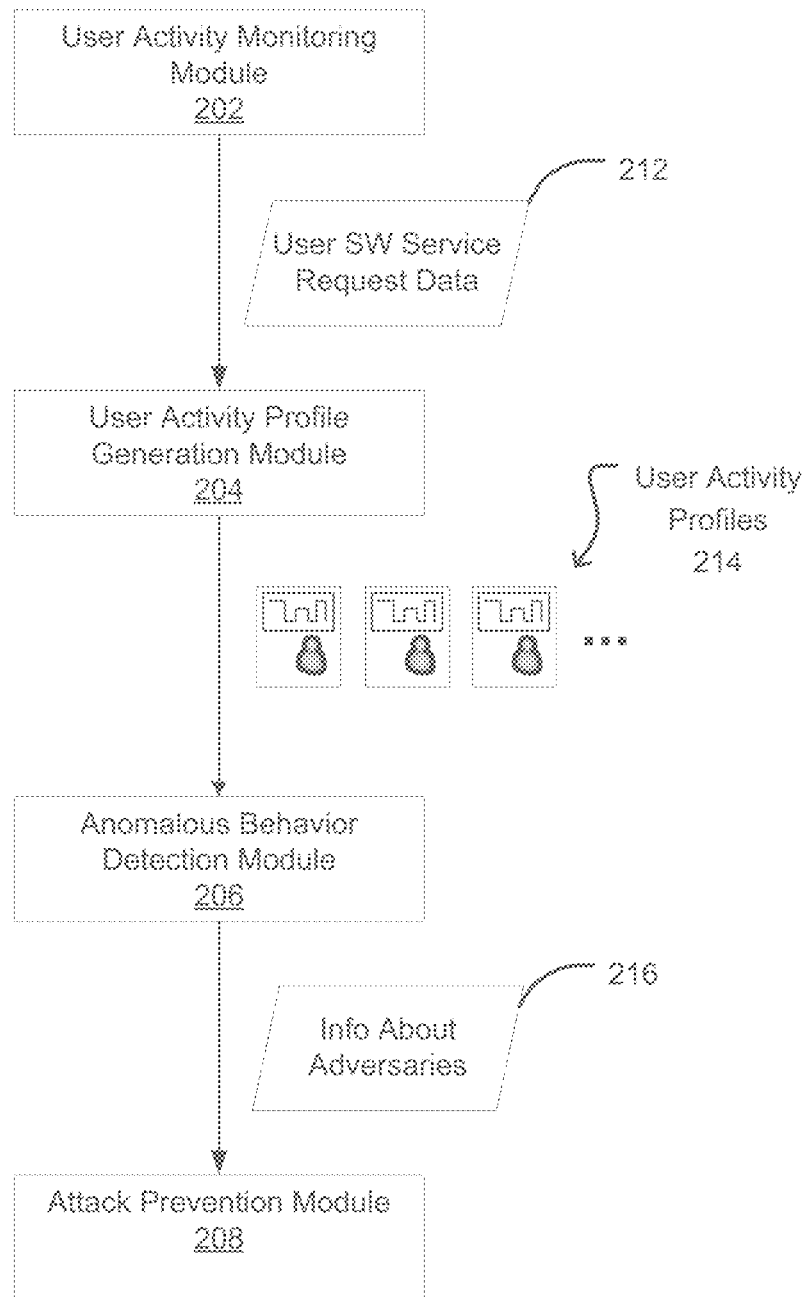
FIG. 2B illustrates the interaction between the modules of the cyberattack detection system of FIG. 2A, according to some embodiments of the technology described herein.

FIG. 2B illustrates interaction between the modules 202, 204, 206, 208 of the cyberattack detection system of FIG. 2A, according to some embodiments of the technology described herein.

As shown in FIG. 2B, in some embodiments, the user activity monitoring module 202 may be configured to monitor the computing activity of users to collect user software service request data 212. The user activity monitoring module 202 may be configured to monitor interaction between user devices and the software service authentication system 100 to obtain the software service request data 212. For example, the user activity monitoring module 202 may monitor communications exchanged between user devices and the software service authentication system 100 and generate records of user authentications and/or software service requests. In some embodiments, the software service request data may include a record of authentications of users and/or requests to access software services. The software service request data may indicate times (e.g., indicated by timestamps) when user authentications were performed and/or times when software services were requested by the user. The user activity monitoring module 202 provides the user software service request data 212 to the user activity profile generation module 204.

As shown in FIG. 2B, in some embodiments, the user activity profile generation module 204 may be configured to generate user activity profiles 214 for each of multiple users that access software services from the software service system 106 through the software service authentication system 100. The user activity profiles 214 may include a user activity profile for Alice 110A and a user activity profile for Bob 110C. The user activity profile generation module 204 may be configured to generate each of the user activity profiles 214 using software service request data associated with the user. For example, the user activity profile generation module 204 may determine values of one or more parameters using the software service request data and store the parameter value(s) in the user activity profile.

As shown in FIG. 2B, in some embodiments, the anomalous behavior detection module 206 may be configured to use the user activity profiles 214 and user software service request data 212 to detect cyberattacks by identifying anomalous user behavior. The anomalous behavior detection module 206 may be configured to determine whether a user's activity in a detection period departs from a pattern of software service requests indicated by the user's activity profile. When the anomalous behavior detection module 206 determines that the user's activity departs from the pattern, the anomalous behavior detection module 206 may identify the user as behaving anomalously. The anomalous behavior detection module 206 may be configured to provide information 216 about the user to the attack prevention module 208.

In some embodiments, the attack prevention module 208 may be configured to use the information 216 about users behaving anomalously to prevent attacks. In some embodiments, the attack prevention module 208 may be configured to provide information (e.g., user activity) about the users to one or more users (e.g., system administrators) for further investigation. In some embodiments, the attack prevention module 208 may be configured to prevent subsequent activity by the users. For example, the attack prevention module 208 may prevent the users from authenticating and/or requesting access to software services through the software service authentication system 100.

Figure 3:
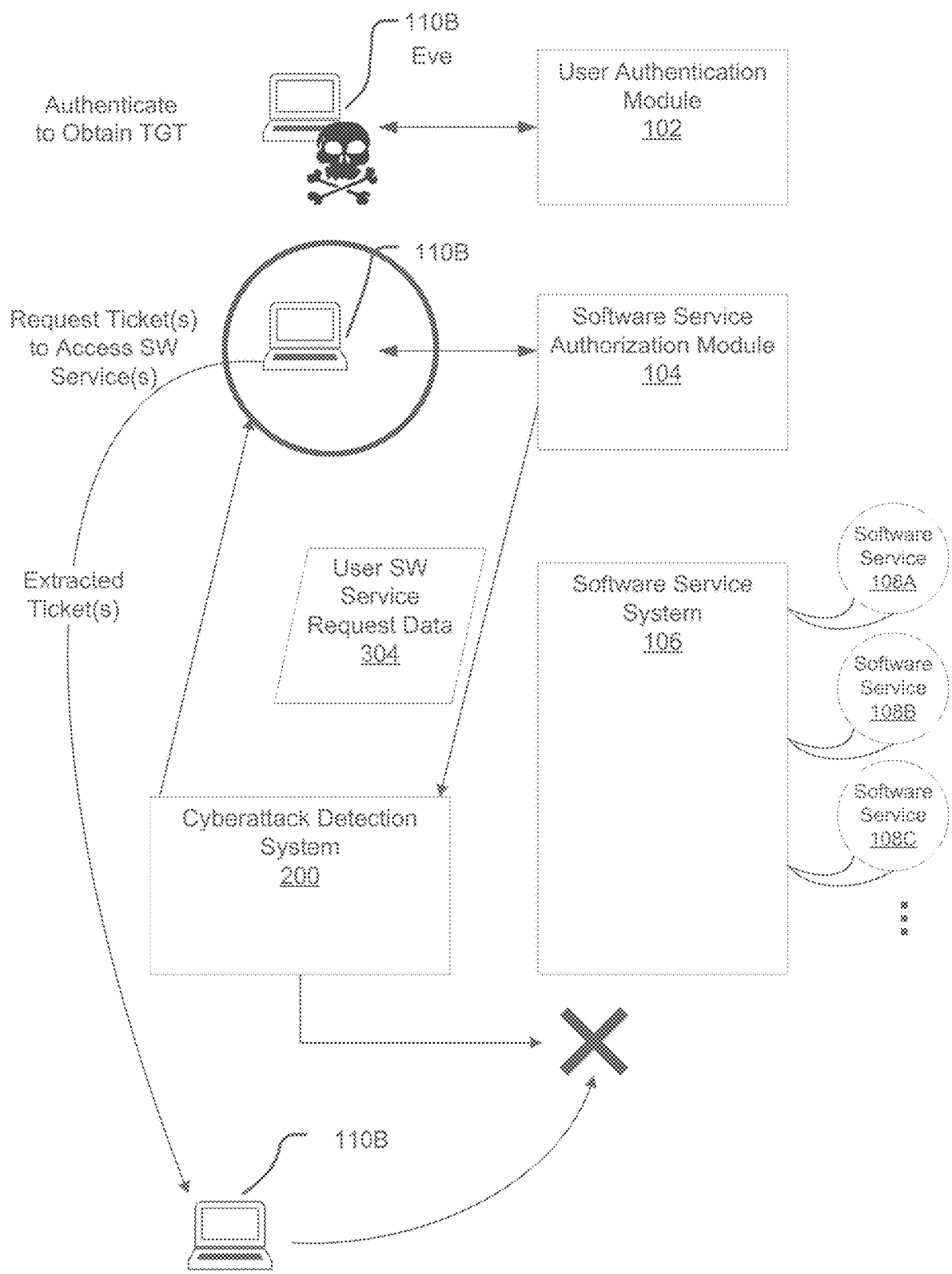
FIG. 3 illustrates detection of a cyberattack, according to some embodiments of the technology described herein.

FIG. 3 illustrates the detection of a cyberattack by the cyberattack detection system 200 described herein with reference to FIGS. 2A-2B, according to some embodiments of the technology described herein. In the example of FIG. 3, Eve 110B may have previously obtained Alice's 110 credentials (e.g., using phishing, malware, or other techniques).

Eve 110B performs authentication with the user authentication module 102 using Alice's 110A credentials as described herein with reference to FIG. 1B. Accordingly, Eve 110B obtains a TGT that Eve 110B can use to request access to software services from the software service authorization module 104. Eve 110B may transmit requests to access one or more software services that include the TGT and identifiers of software service(s). Eve 110B may thus obtain one or more software service tickets that provide access to the software service(s) from the software service system 106. Eve 110B may further extract the software service ticket(s) and attempt to determine password(s) associated with the software service(s) (e.g., by using brute force attacks to crack the software service ticket(s) encrypted using the password(s)).

As illustrated in FIG. 3, the cyberattack detection system 200 obtains software service request data 304 indicating the software service request(s) transmitted by Eve 110B. The cyberattack detection system 200 may use the software service request data 304 to determine whether Eve's 110B activity departs from a pattern of user activity indicated by Alice's 110A user activity profile. For example, the cyberattack detection system 200 may determine values of one or more parameters (e.g., a number of unique software services requested, a ratio of authentications to unique software service requests, and/or an identification of which software services were requested) using the software service request data 304. The cyberattack detection system 200 may determine whether the values of the parameter(s) match a pattern indicated by Alice's 110A user activity profile (e.g., by determining whether parameter value(s) meet threshold parameter value(s) specified in the user activity profile and/or determining whether requested software services match software service(s) indicated in the user activity profile).

In the example of FIG. 3, the cyberattack detection system 200 determines that Eve's 110B behavior is anomalous based on Alice's 110 user activity profile. The cyberattack detection system 200 thus identifies Eves 110B behavior as anomalous. As shown in FIG. 3, in some embodiments, in response to identifying the anomalous behavior, the cyberattack detection system 200 prevents Eve 110B from accessing software services provided by the software service system 106. For example, the cyberattack detection system 200 may cause the software service system 106 to deny access to software service(s). As another example, the cyberattack detection system 200 may end a session in which Eve 110B was authorized to request access to software services.

FIG. 4A illustrates software service request data 400 that may be captured by the cyberattack detection system 200 of FIGS. 2A-2B and a user activity profile 410 generated using the software service request data 400, according to some embodiments of the technology described herein. In some embodiments, the software service request data 400 may be captured by the user activity monitoring module 202 of the cyberattack detection system 200.

As shown in FIG. 4A, in some embodiments, the software servicer request data 400 associated with a user (e.g., obtained by the user activity monitoring module 202) includes a record of authorizations of the user (e.g., performed by the user authentication module 102) along with an indication of the time of the authorization. The software service request data 400 includes a record of an authorization 402A at time t1, an authorization 402B at time t2, and an authorization 402C at time t3. In some embodiments, each authorization may indicate a session in which the user may request access to software services.

As shown in FIG. 4A, the software service request data 400 includes a record of the software service requests by the user in a session initiated after each authorization. The record includes: (1) software service requests 402A-1 at time t11, 402A-2 at time t12, and 402A-3 at time t13 after authorization 402A; (2) software service requests 402B-1 at time t21 and 402B-2 at time t22 after authorization 402B; and (3) software service requests 402C-1 at time t31, 402C-2 at time t32, 402C-3 at time t33, and 402C-4 at time t34 after authorization 402C. Each record of a software service request may include an identification of which software service was requested for access by the user. As an illustrative example, a user authentication may be indicated in a log by a first event code (e.g., 4768) and a software service request may be indicated in the log by a second event code (e.g., 4769). An authorization and its corresponding set of software service request(s) may be identified in the log (e.g., by the user activity monitoring module 202) by identifying, in the log, an entry indicating the first event code and one or more subsequent entries indicating the second event code.

In some embodiments, the user activity monitoring module 202 may be configured to generate the software service request data 400 by: (1) obtaining an initial set of software service request data; and (2) filtering the initial set of software service request data to obtain the software service request data 400. In some embodiments, the user activity monitoring module 202 may be configured to filter the initial set of software service request data by identifying software service requests for software services associated with a particular type of encryption (e.g., for encrypting passwords associated with the software services). The user activity monitoring module 202 may identify software service requests associated with the encryption type and include the identified requests in the software service request data 400. The user activity monitoring module 202 may not include a record of software service requests that are not associated with the encryption type. For example, the user activity monitoring module 202 may filter the initial set of software service request data to include software service request data for software services with associated passwords encrypted using RC4 encryption.

As shown in FIG. 4A, in some embodiments, the user activity profile generation module 204 uses the software service request data 400 to generate a user activity profile 410 and/or update parameters in the user activity profile 410 (e.g., if the user activity profile 410 was previously generated for the user). The user activity profile 410 includes multiple different parameters 412, 414, 416.

As shown in FIG. 4A, the parameter 412 is a threshold number of unique software service requests per detection period for the user. In some embodiments, the user activity profile generation module 204 may be configured to calculate the value of parameter 412 using the software service request data 400. The user activity profile generation module 204 may be configured to: (1) determine the numbers of unique software service requests by the user in portions of a time period in which the software service request data 400 was collected, where the portions are the length of the detection period; and (2) determine the value of the parameter 412 based on the numbers of unique software service requests in the portions. For example, the detection period may be 1 hour in length and the user activity profile generation module 204 may determine the number of unique software service requests in each 1-hour portion of a time period in which the software service request data 400 was collected.

In some embodiments, the user activity profile generation module 204 may be configured to determine a median number of unique software service requests across portions of the time period equivalent to the length of a detection period (e.g., 1 hour). The user activity profile generation module 204 may be configured to determine the value of parameter 412 using the median number of unique software service requests. In some embodiments, the user activity profile generation module 204 may be configured to determine an interquartile range (IQR) of numbers of unique software service requests across portions of the time period equivalent to the length of the detection period. The user activity profile generation module 204 may be configured to determine the value of parameter 412 using the IQR of the number of unique software service requests. In some embodiments, the user activity profile generation module 204 may be configured to determine the threshold number of unique software service requests per detection period using a combination of the determined median and IQR. The user activity profile generation module 204 may be configured to determine the value of parameter 412 to be equal to the median number of software service requests summed with a multiple of the IQR of the numbers of software service requests. For example, the value of parameter 412 may be median+C*IQR, where the value of C is a configurable parameter (e.g., set based on user input received through a GUI). In some embodiments, the value of C may be a value between 0-1, 1-2, 2-3, 3-4, 4-5, 5-6, 6-7, 7-8, 8-9, 9-10, or another suitable range. For example, the value of C may be 3. In cases in which the IQR is too small, the value of parameter 412 may be median+D*median, where D is a configurable parameter (e.g., set based on user input received through a GUI). In some embodiments, the value of D may be a value between 0-1, 1-2, 2-3, 3-4, 4-5, or another suitable range. For example, the value of D may be 1.

Although in the example of FIG. 4A, the user activity profile generation module 204 has software service request data 400 for the user, in some cases, the user activity profile generation module 204 may not have access to historical software service request data for a user. In such cases, the user activity profile generation module 204 may be configured to use a default value for the threshold number 412 of unique software service requests per detection period for the user. For example, the default value may be 1, 2, 3, 4, 5, 6, 7, 8, 9, 10, or other suitable value. In some embodiments, the default value may be a configurable parameter.

In some embodiments, the parameter 412 may be a threshold number of unique requested software services that have a particular attribute. For example, the parameter 412 may be a threshold number of requested software services that have associated keys generated using a particular type of encryption (e.g., RC4 encryption).

As shown in FIG. 4A, the parameter 414 is a threshold ratio of authentications to unique software service requests. In some embodiments, the user activity profile generation module 204 may be configured to determine a ratio of authentication to unique software service requests for each authentication in the software service request data 400. In some embodiments, a ratio of authentication to unique software service requests may be an inverse of the number of unique software service requests in a session initiated by an authentication. For example, the user activity profile generation module 204 may determine a first ratio of 1:3 for the first authentication 402A, a second ratio of 1:2 for the second authentication 402B, and a third ratio of 1:4 for the third authentication 402C. The user activity profile generation module 204 may be configured to determine the value of parameter 414 using the determined ratios. In some embodiments, the user activity profile generation module 204 may be configured to determine an authentication to unique software service request ratio associated with a percentile of the ratios as the value of parameter 414. In some embodiments, the percentile may be a percentile between 1-10%, 10-20%, 20-30%, 30-40%, 40-50%, 50-60%, 60-70%, or 70-80%. For example, the user activity profile generation module 414 may set the value of parameter 414 to the authentication to unique software service request ratio associated with the 30$^{th}$ percentile of the ratios. In some embodiments, the percentile that the parameter 414 is set to may be configurable (e.g., received through a GUI).

Although in the example of FIG. 4A, the user activity profile generation module 204 has software service request data 400 for the user, in some cases, the user activity profile generation module 204 may not have access to sufficient historical software service request data for a user (e.g., because the user is new or has been inactive for a period of time). In some embodiments, the user activity profile generation module 204 may be configured to use a default value for the parameter 414. For example, the user activity profile generation module 204 may determine a default value using values of the parameter 414 for other users (e.g., by averaging the values of the parameter 414, determining a mean value of the parameter 414 across the users, determining a minimum value of the parameter 414 across the users, or another mechanism).

In some embodiments, the user activity profile generation module 204 may be configured to determine the value of parameter 414 for only those users that meet a condition. For example, the user activity profile generation module 204 may determine the value of parameter 414 for those users that are determined to have requested more than their respective threshold numbers of unique software service requests per detection period. The user activity profile generation module 204 may otherwise bypass the determination of a value of parameter 414 for users that do not meet the condition.

The parameter 416 is a collection of identifications of unique software services requested for access by the user as indicated by the software service request data 400. In some embodiments, the user activity profile generation module 204 may be configured to identify every unique software service requested by the user among the software service requests 402A-1, 402A-2. 402A-3, 402B-1, 402B-2, 402C-1, 402C-2, 402C-3, 402C-4 and store an indication of each identified software service in the collection. The value of parameter 416 may thus be an indication of a collection of software services that were accessed by the user.

Although in the example of FIG. 4A, the user activity profile generation module 204 has software service request data 400 for the user, in some cases, the user activity profile generation module 204 may not have access to sufficient historical software service request data for a user (e.g., because the user is new or has been inactive for a period of time). In some embodiments, the user activity profile generation module 204 may be configured to use a default value for the parameter 416. For example, the default value may be an indication of a pre-determined collection of software services. In some embodiments, the user activity profile generation module 204 may be configured to determine the pre-determined collection of software services by determining an expected set of software services to be the pre-determined collection of software services. For example, the user activity profile generation module 204 may determine a set of new software services that new users in a computing environment are expected to access.

In some embodiments, the user activity profile 410 may include parameters in addition to or instead of the parameters 412, 414, 416 described herein. For example, the user activity profile 410 may include a parameter generated based on a mean number of unique software service requests per detection period, a parameter generated based on a variance of the number of unique software service requests across sessions, a parameter generated based on a mode of software service requests per detection period, and/or other parameters. In some embodiments, the parameters may have configurable variables.

Figure 4B:
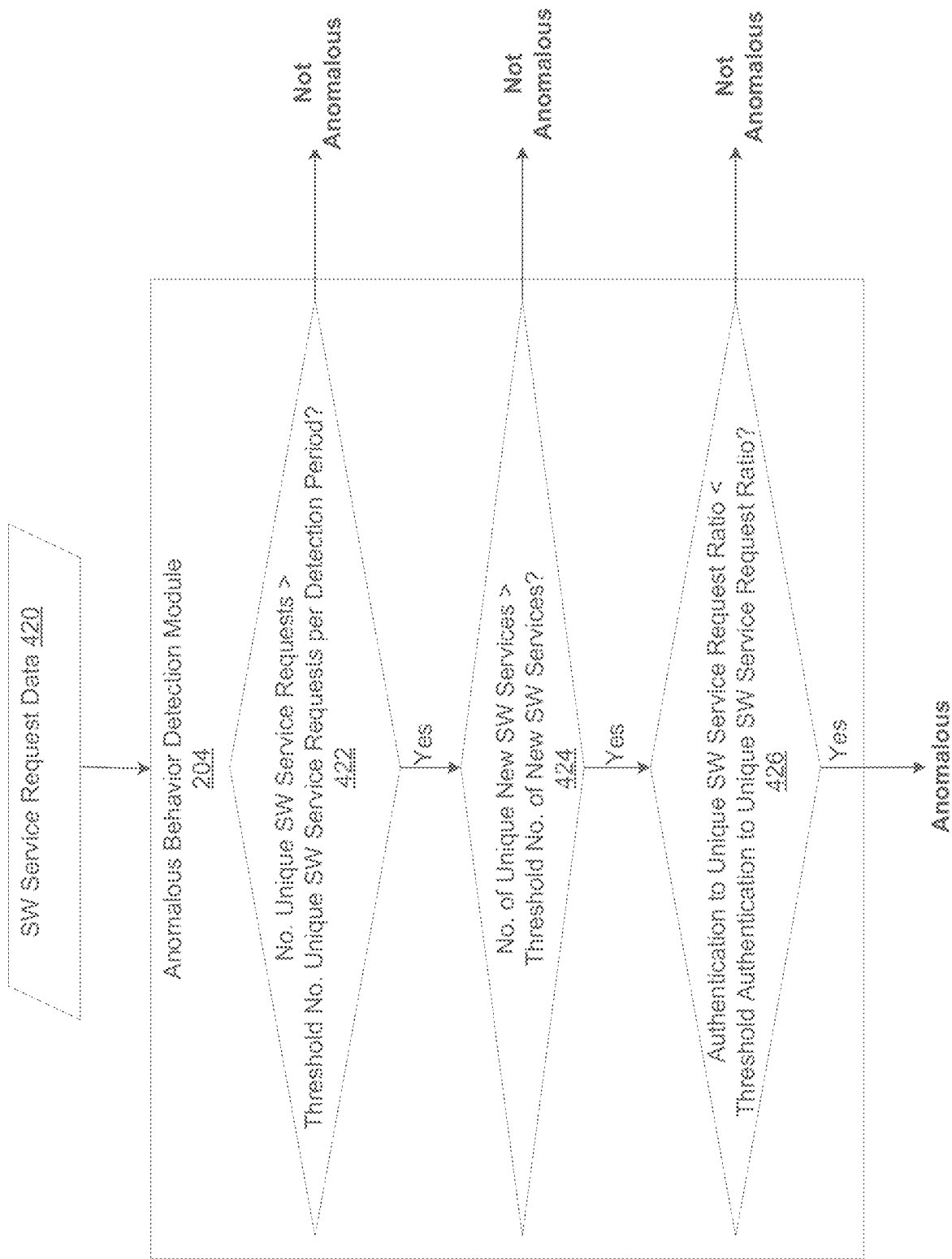
FIG. 4B illustrates the use of the user activity profile of FIG. 4A to determine if activity of the user associated with the user activity profile is anomalous, according to some embodiments of the technology described herein.

FIG. 4B illustrates the use of the user activity profile 410 of FIG. 4A by the anomalous behavior detection module 206 to determine if the activity of the user associated with the user activity profile 410 is anomalous, according to some embodiments of the technology described herein. It should be appreciated that although the determination of parameters of the user activity profile 410 and identification of anomalous user behavior are illustrated separately, in some embodiments, the processes may be performed together. For example, parameters 412, 414, 416 of the user activity profile 410 may be determined at a time when detection is being performed by the anomalous behavior detection module 206. The parameters 412, 414, 416 may thus be populated based on data from the most recent profiling period. In some embodiments, the determination of parameters of the user activity profile 410 and identification of anomalous user behavior may be performed separately.

As shown in FIG. 4B, the anomalous behavior detection module 206 accesses software service request data 420 (e.g., from the software service authentication system 100) that was captured during a detection period (e.g., a 1-hour period). In some embodiments, the software service request data 420 may be structured as described herein with reference to software service request data 400. The software service request data may include a record of one or more user authentications (e.g., performed by the user authentication module 102) and a set of one or more software service requests (e.g., received by the software service authorization module 104) associated with each of the user authentication(s).

As shown in FIG. 4B, the anomalous behavior detection module 204 performs multiple stages of processing for the user to detect anomalous behavior indicative of an attack.

The processing begins at block 422, where the anomalous behavior detection module 204 determines the number of unique software service requests by the user during the detection period using the software service request data 420. The anomalous behavior detection module 204 compares the number of unique software service requests by the user during the detection period to the threshold number of unique software service requests per detection period specified by parameter 412 of the user activity profile 410. If the number of unique software service requests in the detection period exceeds the threshold number of unique software service requests per detection period specified by parameter 412, then the anomalous behavior detection module 204 continues to perform processing at block 424. Otherwise, the anomalous behavior detection module 204 may determine that the user's activity is not anomalous.

In some embodiments, at block 422, the anomalous behavior detection module 204 may be configured to determine the number of unique software services requested by the user from among a subset of requested software services that share a particular attribute. For example, the anomalous behavior detection module 204 may determine the number of unique software services requested by the user that have associated keys generated using a particular type of encryption (e.g., RC4 encryption).

At block 424, the anomalous behavior detection module 204 determines a number of new unique software services requested by the user in the detection period that were not previously requested by the user. The anomalous behavior detection module 204 may be configured to determine the number of new unique software services to be the number of unique software services requested by the user that are not included in the collection 416 of previously requested software services specified in the user activity profile 410. The anomalous behavior detection module 204 compares the number of new unique software service requests to a threshold number of new software services. In some embodiments, the threshold number of new software services may be 1, 2, 3, 4, 5, 6, 7, 8, 9, 10, or other suitable number of new software services. In some embodiments, the threshold number of new software services may be configurable (e.g., by user input). If the number of new unique software services accessed by the user is greater than the threshold number of new software services, then the anomalous detection behavior detection module proceeds to perform processing at block 426. Otherwise, the anomalous behavior module 204 may determine that the user's activity is not anomalous.

At block 426, the anomalous behavior detection module 204 determines an authentication to unique software service request ratio for each of the authentication(s) in the detection period specified in the software service request data 420. For example, for each authentication, the anomalous behavior detection module 204 may determine the ratio to be the inverse of the number of unique software service requests in a session initiated with the authentication. The anomalous behavior detection module 204 may be configured to determine whether an authentication to unique software service request ratio for any authentication is greater than the threshold ratio specified by parameter 416 of the user activity profile. If the anomalous behavior detection module 204 determines that the authentication to unique software service request ratio for any authentication is greater than the threshold ratio specified by parameter 416 of the user activity profile, then the anomalous behavior detection module 204 determines that the user's behavior is anomalous. Otherwise, the anomalous behavior module 204 may determine that the user's activity is not anomalous.

Figure 5A:
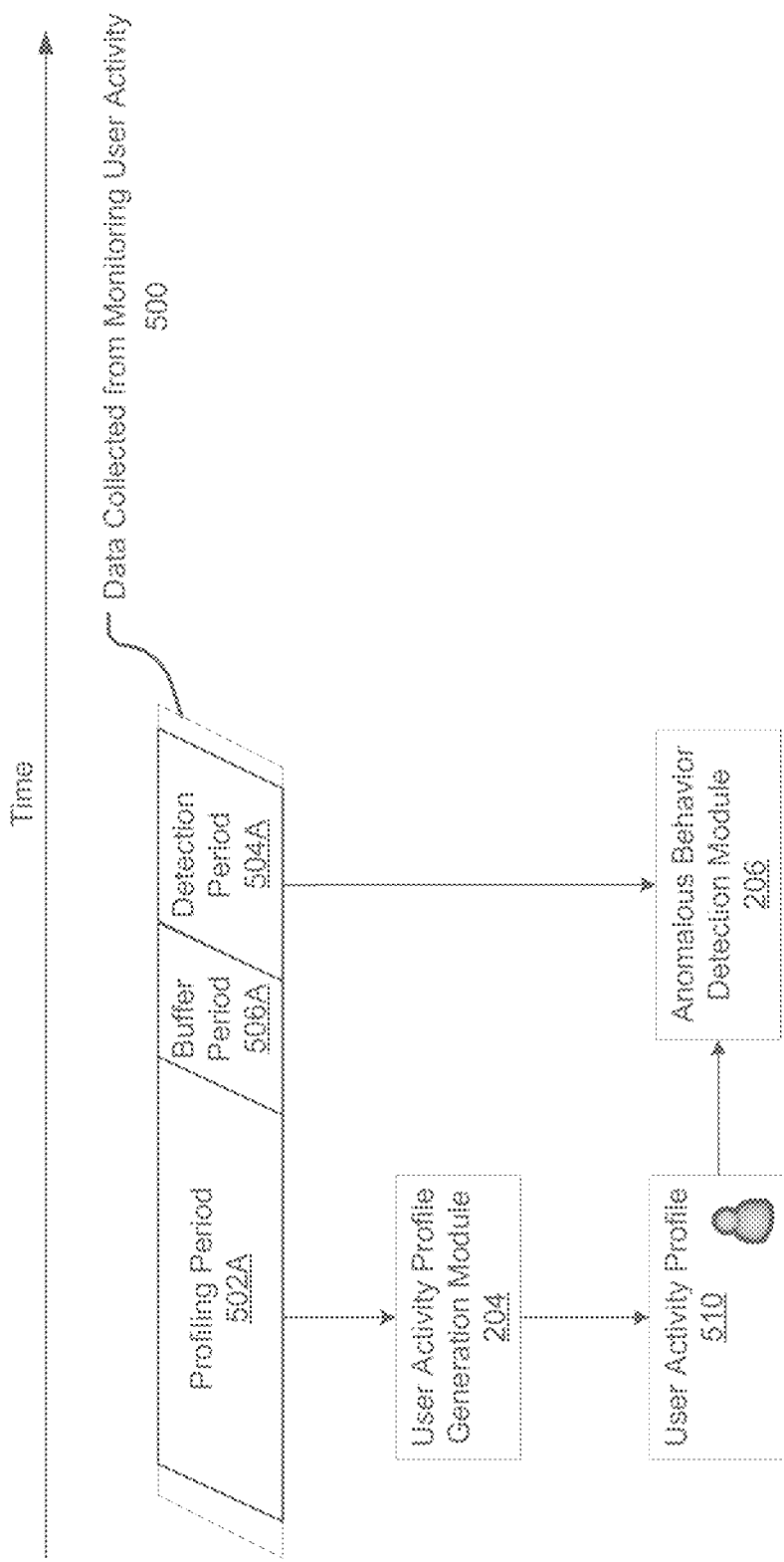
FIG. 5A is a diagram illustrating data accessed by a cyberattack detection system to perform cyberattack detection, according to some embodiments of the technology described herein.

FIG. 5A is a diagram illustrating data accessed by the cyberattack detection system 200 to perform cyberattack detection, according to some embodiments of the technology described herein. The data 500 includes data from a profiling period ("profiling period data") 502A and data from a detection period 504B in which attack detection is being performed ("detection period data"), according to some embodiments of the technology described herein. In some embodiments, the cyberattack detection system 200 may be configured to perform attack detection using profiling period data 502A and detection period data 502B. The user activity profile generation module 204 may be configured to use the profiling period data 502A to generate and/or update a user activity profile 510 (e.g., as described herein with reference to FIG. 4A). The anomalous behavior detection module 206 may be configured to use the detection period data 504A to determine if a user associated with the user activity profile 510 behaved anomalously during the detection period (e.g., as described herein with reference to FIG. 4B).

As illustrated in FIG. 5A, in some embodiments, the profiling period may precede the detection period by a buffer period 506A. In some embodiments, the buffer period 506A may be 1-5 hours, 5-10 hours, 10-15 hours, 15-20 hours, 20-25 hours, or other suitable amount of time. For example, the profiling period may precede the detection period by a buffer period 506A of at least 12 hours. This may ensure that the profiling data does not include data from an ongoing attack that can affect the outcome of attack detection (e.g., by affecting the generation of the user activity profile). In some embodiments, the amount of time may be configurable (e.g., by user input).

Figure 5B:
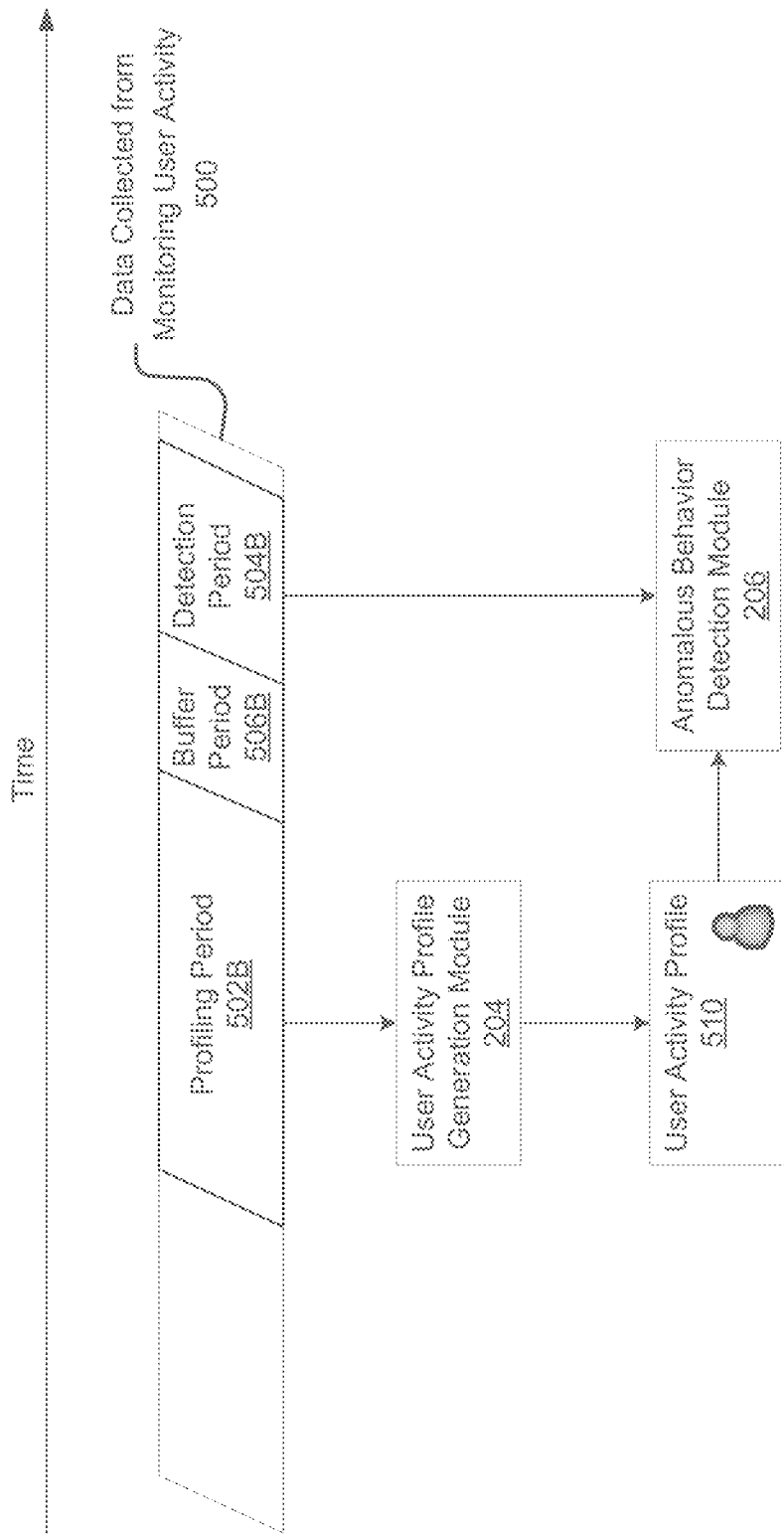
FIG. 5B is a diagram illustrating data accessed by the cyberattack detection system to perform cyberattack detection subsequent to the detection of FIG. 5A, according to some embodiments of the technology described herein.

FIG. 5B is a diagram illustrating profiling period data 502B and detection period data 504B that are obtained in profiling and detection periods subsequent to the profiling and detection periods of FIG. 5A, according to some embodiments of the technology described herein. The user activity profile generation module 204 may be configured to use the profiling period data 502B to generate and/or update the user activity profile 510. Likewise, the anomalous behavior detection module 206 may be configured to use the detection period data 504B to identify anomalous user behavior indicative of an attack (e.g., as described herein with reference to FIG. 4B). As shown in FIG. 5B, the profiling period 502B precedes the detection period 504B by a buffer period 506B. In some embodiment, the buffer period 502B may be the same length as the buffer period 502A described herein with reference to FIG. 5A. In some embodiments, the buffer period 506B may be a different length than the length of the buffer period 502A.

In some embodiments, the cyberattack detection system 200 may be configured to periodically perform attack detection. As illustrated by FIGS. 5A-5B, the cyberattack detection system 200 may be configured to obtain a new set of profiling period data and detection period data for each detection (e.g., to update a user activity profile and to identify anomalous behavior using the user activity profile). The cyberattack detection system 200 may be configured to continuously monitor user activity for detection of attacks.

Figure 6:
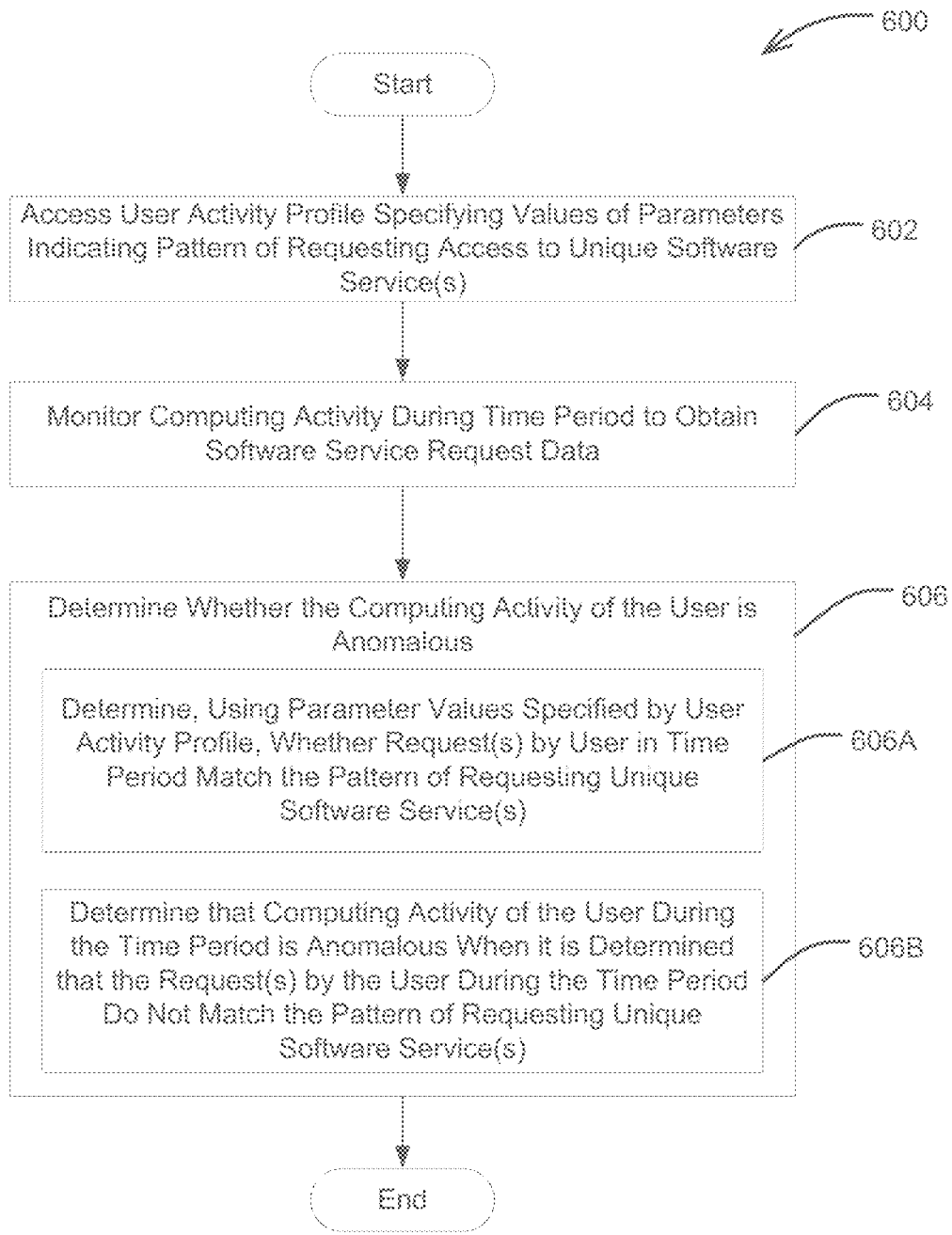
FIG. 6 is an example process for detecting a cyberattack against a software service authentication system that authorizes access to software services, according to some embodiments of the technology described herein.

FIG. 6 is an example process 600 for detecting a cyberattack against a software service authentication system that authorizes access to software services, according to some embodiments of the technology described herein. In some embodiments, process 600 may be performed by cyberattack detection system 200 described herein with reference to FIGS. 2A-2B.

Process 600 begins at block 602, where the system accesses a user activity profile (e.g., user activity profile 410 described herein with reference to FIG. 4A) specifying values of parameters indicating a user's pattern of requesting access (e.g., requesting software service tickets from the software service authorization module 104) to one or more unique software services. Example parameter values that may be specified by the user activity profile are described herein with reference to FIG. 4A.

In some embodiments, accessing the user activity profile comprises generating the user activity profile. The system may be configured to generate the user activity profile by monitoring historical user activity (e.g., in a time period preceding a time period for which cyberattack detection is being performed) to obtain software service request data indicating one or more previous requests by the user to access one or more software services through the software service authentication system and determining the parameter values using the software service request data. The system may be configured to store the parameter values in the user activity profile. In some embodiments, accessing the user activity profile comprises updating the parameter values of the user activity profile. The system may be configured to use data obtained from monitoring historical user activity to update the parameter values specified in the user activity profile. An example technique of generating and/or updating a user activity profile is described herein with reference to FIG. 4A.

Next, process 600 proceeds to block 604, where the system monitors computing activity of the user during a time period (e.g., a detection period) to obtain software service request data (e.g., software service request data 420 described herein with reference to FIG. 4B) indicating one or more requests by the user during the time period to access one or more software services through the software authentication system (e.g., by performing user authentication to obtain a TGT and using the TGT to request one or more software service tickets to access the software service(s)). In some embodiments, the system may be configured to store, in the software service request data, a record of user authentication(s) in the time period and software service request(s) by the user in each session corresponding to a respective one of the user authentication(s).

Next, process 600 proceeds to block 606, where the system determines, using the software service request data and the user activity profile, whether the computing activity of the user during the time period is anomalous. Block 606 includes two blocks 606A and 606B.

At block 606A, the system determines, using parameter values specified by the user activity profile, whether the request(s) by the user during the time period match the user's pattern of requesting access to unique software service(s) through the software service authentication system. In some embodiments, the system may be configured to perform a multi-stage process of determining whether the request(s) by the user in the time period match the pattern indicated by the user activity profile. The system may be configured to use the parameter values specified by the user activity profile to perform the multi-stage process. At each stage, the system may determine whether a condition is met using a respective one of the parameter values. An example multi-stage process is described herein with reference to FIG. 4B.

At block 606B, the system determines that the computing activity of the user during the time period is anomalous when it is determined that the software service request(s) do not match the pattern of requesting access to unique software service(s) indicated by the user activity profile. In some embodiments, the system may be configured to determine the computing activity is anomalous when a condition at each of multiple stages is met (e.g., as described herein with reference to FIG. 4B). For example, the system may determine the computing activity in the time period to be anomalous if a number of unique software service requests during the time period exceed a threshold indicated by the user activity profile, the number of new software services that were requested in the time period and which the user did not previously request exceeds a threshold number of new software services, and if a ratio of authentication to unique software service requests in the time period is less than a threshold ratio.

In some embodiments, the system may be configured to detect an attack when the user's computing activity is determined to be anomalous. The system may be configured to perform preventing action(s) in response to detecting the attack. In some embodiments, the system may be configured to provide information about the user to system administrators for further investigation. In some embodiments, the system may be configured to prevent the user from performing certain actions (e.g., performing authorization and/or requesting access to software services). In some embodiments, the system may be configured to request that password(s) associated with software service(s) that the user requested to access be changed. For example, the system may transmit a message to a software service system hosting the software service(s) (e.g., software service system 106) that triggers a password change for account(s) associated with the software service(s).

Figure 7:
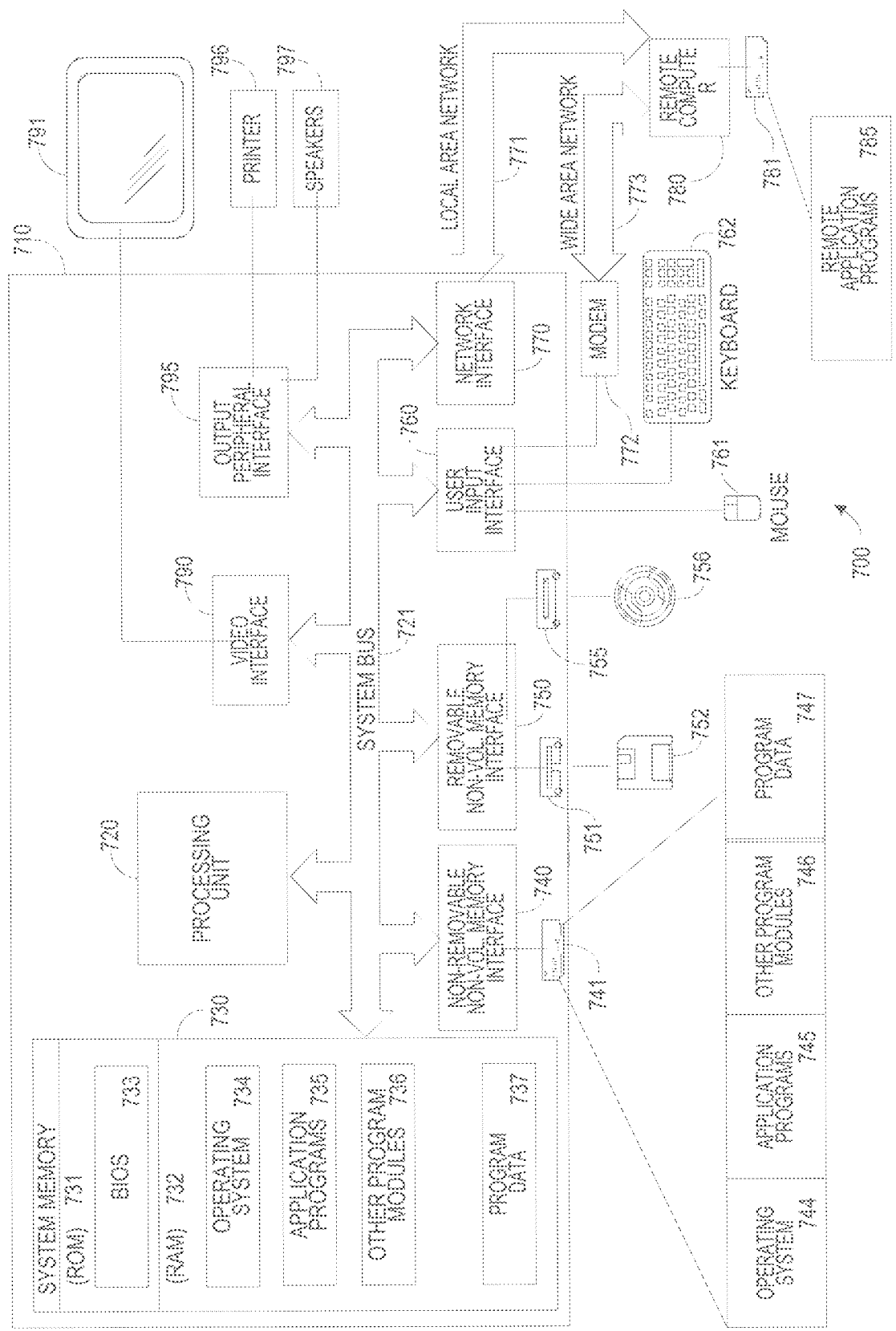
FIG. 7 shows a block diagram of an exemplary computing device, in accordance with some embodiments of the technology described herein.

FIG. 7 shows a block diagram of an exemplary computing device, in accordance with some embodiments of the technology described herein. The computing system environment 700 is only one example of a suitable computing environment and is not intended to suggest any limitation as to the scope of use or functionality of the technology described herein.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the technology described herein includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile or nonvolatile computer storage media. By way of example only, FIG. 7 illustrates a hard disk drive 741 that reads from or writes to non-removable, nonvolatile magnetic media, a flash drive 751 that reads from or writes to a removable, nonvolatile memory 752 such as flash memory, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media described above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. An actor may enter commands and information into the computer 710 through input devices such as a keyboard 762 and pointing device 761, commonly referred to as a mouse, trackball, or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device, or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets, and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the actor input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art. Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, a tablet computer, a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. A computer-readable storage medium includes any computer memory configured to store software, for example, the memory of any computing device such as a smart phone, a laptop, a desktop, a rack-mounted computer, or a server (e.g., a server storing software distributed by downloading over a network, such as an app store)). As used herein, the term "computer-readable storage medium" encompasses only a non-transitory computer-readable medium that can be considered to be a manufacture (i.e., article of manufacture) or a machine. Alternatively, or additionally, aspects of the technology described herein may be embodied as a computer readable medium other than a computer-readable storage medium, such as a propagating signal.

The terms "program" or "software" are used herein in a generic sense to refer to any type of computer code or set of processor-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion among a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 6 and 7. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A-only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method for detecting attacks against a software service authentication system configured to authorize access to software services, the method comprising:
   using at least one processor to perform:
      accessing a first user activity profile specifying values of parameters indicating a first user's pattern of requesting access to one or more unique software services through the software service authentication system, wherein:
         the first user is authorized to request access to software services after authentication of the user by the software service authentication system; and
         the values of the parameters indicating the first user's pattern of requesting access to one or more unique software services indicate a threshold ratio of authentications to unique software service requests;
      monitoring computing activity of the first user during a first time period to obtain software service request data indicating one or more requests by the first user during the first time period to access one or more software services through the software service authentication system; and determining, using the software service request data and the first user activity profile, whether the computing activity of the first user during the first time period is anomalous, the determining comprising:

determining, using the values of the parameters specified by the first user activity profile, whether the one or more requests by the first user during the first time period match the first user's pattern of requesting access to one or more unique software services through the software service authentication system; and determining that the computing activity of the first user during the first time period is anomalous when it is determined that the one or more requests by the first user during the first time period do not match the first user's pattern of requesting access to one or more unique software services through the software service authentication system.

2. The method of claim 1, wherein determining, using the values of the parameters specified by the first user activity profile, whether the one or more requests by the first user during the first time period match the first user's pattern of requesting access to one or more unique software services through the software service authentication system comprises:

determining a number of unique software service requests after a first authentication of the first user in the first time period;

determining an inverse of the number of unique software service requests after the first authentication of the first user in the first time period; and determining whether the inverse of the number of unique software service requests is less than the threshold ratio of authentications to unique software service requests.

3. The method of claim 1, further comprising determining the threshold ratio of authentications to unique software service requests by:

determining, for each of a plurality of authentications of the user in a time period preceding the first time period, an inverse of a number of unique software service requests after the authentication to obtain a plurality of ratios of authentications to unique software service requests; and determining the threshold ratio of authentications to unique software service requests using the plurality of ratios of authentications to unique software service requests.

4. The method of claim 3, wherein the software service request data comprises:

an indication of a plurality of authentications of the first user in the time period preceding the first time period, the plurality of authentications associated with respective ones of a plurality of sessions; and an indication of software service requests in the plurality of sessions.

5. The method of claim 3, wherein the time period preceding the first time period ends at least a threshold amount of time prior to a start of the first time period.

6. The method of claim 5, wherein the threshold amount of time is 12 hours.

7. A method for detecting attacks against a software service authentication system configured to authorize access to software services using Kerberos authentication, the method comprising:

using at least one processor to perform:

accessing a first user activity profile specifying values of parameters indicating a first user's pattern of requesting access to one or more unique software services through the software service authentication system;

monitoring computing activity of the first user during a first time period to obtain software service request data indicating one or more requests by the first user during the first time period to access one or more software services through the software service authentication system;

determining, using the software service request data and the first user activity profile, whether the computing activity of the first user during the first time period is anomalous, the determining comprising:

determining, using the values of the parameters specified by the first user activity profile, whether the one or more requests by the first user during the first time period match the first user's pattern of requesting access to one or more unique software services through the software service authentication system; and determining that the computing activity of the first user during the first time period is anomalous when it is determined that the one or more requests by the first user during the first time period do not match the first user's pattern of requesting access to one or more unique software services through the software service authentication system; and detecting a Kerberoasting attack when it is determined that the computing activity of the first user during the first time period is anomalous.

8. The method of claim 7, wherein the values of parameters indicating the first user's pattern of requesting access to one or more unique software services indicate a threshold number of unique software service requests.

9. The method of claim 8, wherein determining, using the values of the parameters specified by the first user activity profile, whether the one or more requests by the first user during the first time period match the first user's pattern of requesting access to one or more unique software services through the software service authentication system comprises:

determining a number of unique software service requests of the one or more requests by the first user during the first time period; and determining whether the number of unique software service requests exceeds the threshold number of unique software service requests indicated by the first user activity profile.

10. The method of claim 7, wherein accessing the first user activity profile comprises:

accessing user software service request data indicating requests by the first user to access software services during a time period preceding the first time period; and generating the first user activity profile using the user service request data at least in part by determining the values of the parameters.

11. The method of claim 7, wherein the values of the parameters indicating the first user's pattern of requesting access to one or more unique software services through the software service authentication system indicate one or more software services that the first user previously requested to access in a time period preceding the first time period.

12. The method of claim 7, further comprising:
transmitting, to at least one device, an indication of a detected attack by the first user when it is determined that the computing activity of the first user during the first time period is anomalous.

13. The method of claim 12, further comprising:
preventing the first user from being authorized to access one or more software services through the software service authentication system when it is determined that the computing activity of the first user during the first time period is anomalous.

14. The method of claim 7, wherein monitoring computing activity of the first user during the first time period to obtain the software service request data indicating the one or more requests by the first user during the first time period to access the one or more software services through the software service authentication system comprises:
storing an indication of one or more requests for one or more software service tickets to access the one or more software services.

15. A method for detecting attacks against a software service authentication system configured to authorize access to software services of claim 11, the method comprising:
using at least one processor to perform:
accessing a first user activity profile specifying values of parameters indicating a first user's pattern of requesting access to one or more unique software services through the software service authentication system, wherein the values of the parameters indicating the first user's pattern of requesting access to one or more unique software services through the software service authentication system indicate one or more software services that the first user previously requested to access in a time period preceding a first time period;
monitoring computing activity of the first user during the first time period to obtain software service request data indicating one or more requests by the first user during the first time period to access one or more software services through the software service authentication system; and
determining, using the software service request data and the first user activity profile, whether the computing activity of the first user during the first time period is anomalous, the determining comprising:
determining, using the values of the parameters specified by the first user activity profile, whether the one or more requests by the first user during the first time period match the first user's pattern of requesting access to one or more unique software services through the software service authentication system, wherein determining, using the values of the parameters specified by the first user activity profile, whether the one or more requests by the first user during the first time period match the first user's pattern of requesting access to one or more unique software services through the software service authentication system comprises:
determining a number of new unique software services to which the first user requests access during the first time period that are not included in the one or more unique software services that the first user previously requested to access in the time period preceding the first time period; and
determining whether the number of new unique software services is greater than or equal to a threshold number of new software services; and
determining that the computing activity of the first user during the first time period is anomalous when it is determined that the one or more requests by the first user during the first time period do not match the first user's pattern of requesting access to one or more unique software services through the software service authentication system.

16. A method for detecting attacks against a software service authentication system configured to authorize access to software services, the method comprising:
using at least one processor to perform:
accessing a first user activity profile specifying values of parameters indicating a first user's pattern of requesting access to one or more unique software services through the software service authentication system;
monitoring computing activity of the first user during a first time period to obtain software service request data indicating one or more requests by the first user during the first time period to access one or more software services through the software service authentication system;
determining, using the software service request data and the first user activity profile, whether the computing activity of the first user during the first time period is anomalous, the determining comprising:
determining, using the values of the parameters specified by the first user activity profile, whether the one or more requests by the first user during the first time period match the first user's pattern of requesting access to one or more unique software services through the software service authentication system; and
determining that the computing activity of the first user during the first time period is anomalous when it is determined that the one or more requests by the first user during the first time period do not match the first user's pattern of requesting access to one or more unique software services through the software service authentication system;
accessing a second user activity profile specifying values of parameters indicating a second user's pattern of requesting access to one or more unique software services through the software service authentication system;
monitoring computing activity of the second user during the first time period to obtain second software service request data indicating one or more requests by the second user during the first time period to access one or more software services through the software service authentication system; and
determining, using the second software service request data and the second user activity profile, whether the computing activity of the second user during the first time period is anomalous, the determining comprising:
determining, using the parameter values specified by the second user activity profile, whether the one or more requests by the second user during the first time period match the second user's pattern of requesting access to one or more unique software services through the software service authentication system; and determining that the computing activity of the second user during the first time period is not anomalous when it is determined that the one or more requests by the second user during the first time period match the second user's pattern of requesting access to one or more unique software services through the software service authentication system.

17. A method for detecting attacks against a software service authentication system configured to authorize access to software services, the method comprising:

using at least one processor to perform:

accessing a first user activity profile specifying values of parameters indicating a first user's pattern of requesting access to one or more unique software services through the software service authentication system;

monitoring computing activity of the first user during a second time period, preceding a first time period, to obtain second software service request data indicating one or more requests by the first user during the second time period to access one or more software services through the software service authentication system;

monitoring computing activity of the first user during the first time period to obtain software service request data indicating one or more requests by the first user during the first time period to access one or more software services through the software service authentication system;

updating the values of the parameters specified by the first user activity profile using the second software service request data prior to determining, using the software service request data and the first user activity profile, whether the computing activity of the first user during the first time period is anomalous; and determining, using the software service request data and the first user activity profile, whether the computing activity of the first user during the first time period is anomalous, the determining comprising:

determining, using the values of the parameters specified by the first user activity profile, whether the one or more requests by the first user during the first time period match the first user's pattern of requesting access to one or more unique software services through the software service authentication system; and determining that the computing activity of the first user during the first time period is anomalous when it is determined that the one or more requests by the first user during the first time period do not match the first user's pattern of requesting access to one or more unique software services through the software service authentication system.

18. A system for detecting cyberattacks against a software service authentication system configured to authorize access to software services using Kerberos authentication, the system comprising:

at least one processor; and at least one non-transitory computer-readable storage medium storing instructions that, when executed by the at least one processor, cause the at least one processor to:

access a first user activity profile specifying values of parameters indicating a first user's pattern of requesting access to one or more unique software services through the software service authentication system;

monitor computing activity of the first user during a first time period to obtain software service request data indicating one or more requests by the first user during the first time period to access one or more software services through the software service authentication system;

determine, using the software service request data and the first user activity profile, whether the computing activity of the first user during the first time period is anomalous, the determining comprising:

determining, using the values of the parameters specified by the first user activity profile, whether the one or more requests by the first user during the first time period match the first user's pattern of requesting access to one or more unique software services through the software service authentication system; and determining that the computing activity of the first user during the first time period is anomalous when it is determined that the one or more requests by the first user during the first time period do not match the first user's pattern of requesting access to one or more unique software services through the software service authentication system; and detect a Kerberoasting attack when it is determined that the computing activity of the first user during the first time period is anomalous.

19. A non-transitory computer-readable storage medium storing instructions that, when executed by at least one processor, cause the at least one processor to perform a method for detecting attacks against a software service authentication system configured to authorize access to software services using Kerberos authentication, the method comprising:

accessing a first user activity profile specifying values of parameters indicating a first user's pattern of requesting access to one or more unique software services through the software service authentication system;

monitoring computing activity of the first user during a first time period to obtain software service request data indicating one or more requests by the first user during the first time period to access one or more software services through the software service authentication system;

determining, using the software service request data and the first user activity profile, whether the computing activity of the first user during the first time period is anomalous, the determining comprising:

determining, using the values of the parameters specified by the first user activity profile, whether the one or more requests by the first user during the first time period match the first user's pattern of requesting access to one or more unique software services through the software service authentication system; and determining that the computing activity of the first user during the first time period is anomalous when it is determined that the one or more requests by the first user during the first time period do not match the first user's pattern of requesting access to one or more unique software services through the software service authentication system; and detecting a Kerberoasting attack when it is determined that the computing activity of the first user during the first time period is anomalous.

\* \* \* \* \*

UNITED STATES PATENT AND TRADEMARK OFFICE
CERTIFICATE OF CORRECTION

| | | |
|---|---|---|
| PATENT NO. | : 12,413,606 B2 | Page 1 of 1 |
| APPLICATION NO. | : 18/478302 | |
| DATED | : September 9, 2025 | |
| INVENTOR(S) | : Vasudha Shivamoggi et al. | |

It is certified that error appears in the above-identified patent and that said Letters Patent is hereby corrected as shown below:

In the Claims

In Claim 15, Column 31, Line 27:
to software services of claim 11, the method comprising:
Should read:
to software services, the method comprising:

Signed and Sealed this
Twenty-eighth Day of October, 2025

John A. Squires
*Director of the United States Patent and Trademark Office*